(12) United States Patent
Yun et al.

(10) Patent No.: US 11,551,662 B2
(45) Date of Patent: Jan. 10, 2023

(54) VOICE RECOGNITION DEVICE AND METHOD FOR LEARNING VOICE DATA

(71) Applicant: LG ELECTRONICS INC., Seoul (KR)

(72) Inventors: Hwansik Yun, Seoul (KR); Wonho Shin, Seoul (KR); Yongchul Park, Seoul (KR); Sungmin Han, Seoul (KR); Siyoung Yang, Seoul (KR); Sangki Kim, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 17/088,480

(22) Filed: Nov. 3, 2020

(65) Prior Publication Data

US 2021/0210067 A1    Jul. 8, 2021

(30) Foreign Application Priority Data

Jan. 8, 2020    (KR) .................. 10-2020-0002400

(51) Int. Cl.
  *G10L 17/00*    (2013.01)
  *G10L 13/02*    (2013.01)
  *G10L 15/16*    (2006.01)

(52) U.S. Cl.
  CPC .............. *G10L 13/02* (2013.01); *G10L 15/16* (2013.01)

(58) Field of Classification Search
  None
  See application file for complete search history.

(56) References Cited

U.S. PATENT DOCUMENTS

| | | | | |
|---|---|---|---|---|
| 5,649,222 A | * | 7/1997 | Mogilevsky | G06F 40/232 715/257 |
| 6,085,206 A | * | 7/2000 | Domini | G06F 40/232 715/257 |
| 10,140,089 B1 | * | 11/2018 | Paranjpe | G10L 19/0018 |
| 10,163,436 B1 | * | 12/2018 | Slifka | G10L 13/00 |
| 10,599,767 B1 | * | 3/2020 | Mattera | G06F 40/268 |
| 2005/0143978 A1 | * | 6/2005 | Martin | G10L 25/78 704/208 |
| 2008/0270137 A1 | * | 10/2008 | Dickson | G10L 13/047 704/260 |
| 2010/0082344 A1 | * | 4/2010 | Naik | G10L 13/033 704/258 |
| 2011/0087491 A1 | * | 4/2011 | Wittenstein | G10L 15/26 704/235 |
| 2015/0149178 A1 | * | 5/2015 | Kim | G10L 13/10 704/260 |

(Continued)

*Primary Examiner* — Jakieda R Jackson
(74) *Attorney, Agent, or Firm* — Lee, Hong, Degerman, Kang & Waimey PC

(57) ABSTRACT

A voice recognition device and a method for learning voice data using the same are disclosed. The voice recognition device combines feature information for various speakers with a text-to-speech function to generate voice data recognized by a voice recognition unit, and can improve voice recognition efficiency by allowing the voice recognition unit itself to learn various voice data. The voice recognition device can be associated with an artificial intelligence module, a robot, an augmented reality (AR) device, a virtual reality (VR) device, devices related to 5G services, and the like.

13 Claims, 21 Drawing Sheets

(56) References Cited

U.S. PATENT DOCUMENTS

| | | | |
|---|---|---|---|
| 2017/0148464 A1* | 5/2017 | Zhang | G10L 13/10 |
| 2017/0154629 A1* | 6/2017 | Lu | G10L 15/30 |
| 2018/0052828 A1* | 2/2018 | Na | G06F 40/42 |
| 2018/0157758 A1* | 6/2018 | Arrizabalaga | G06N 3/08 |
| 2018/0315438 A1* | 11/2018 | Davies | G10L 25/60 |
| 2018/0336463 A1* | 11/2018 | Bloom | G06N 3/0454 |
| 2019/0005399 A1* | 1/2019 | Noguchi | G06N 3/084 |
| 2019/0057081 A1* | 2/2019 | Choi | G06N 3/08 |
| 2019/0066680 A1* | 2/2019 | Woo | G10L 15/22 |
| 2019/0171929 A1* | 6/2019 | Abadi | G06N 3/084 |
| 2019/0204907 A1* | 7/2019 | Xie | A63F 13/424 |
| 2019/0254572 A1* | 8/2019 | Suwa | H04R 3/04 |
| 2019/0378493 A1* | 12/2019 | Kim | G10L 15/22 |
| 2020/0074234 A1* | 3/2020 | Tong | G06V 10/82 |
| 2020/0090214 A1* | 3/2020 | Tushinskiy | G10L 15/22 |
| 2020/0105245 A1* | 4/2020 | Gupta | G10L 13/033 |
| 2020/0143803 A1* | 5/2020 | Hirabayashi | G06Q 10/00 |
| 2020/0152194 A1* | 5/2020 | Jeong | G10L 13/047 |
| 2020/0152197 A1* | 5/2020 | Penilla | G10L 25/63 |
| 2020/0193264 A1* | 6/2020 | Zavesky | G06N 20/00 |
| 2020/0311214 A1* | 10/2020 | Chatterjee | G06F 16/35 |
| 2020/0364252 A1* | 11/2020 | Chang | G06N 3/0454 |
| 2020/0411018 A1* | 12/2020 | Chakravarty | G10L 21/007 |
| 2021/0090576 A1* | 3/2021 | Salazar | G10L 25/66 |

* cited by examiner

VOICE RECOGNITION DEVICE AND METHOD FOR LEARNING VOICE DATA

CROSS-REFERENCE TO RELATED APPLICATION(S)

Pursuant to 35 U.S.C. § 119(a), this application claims the benefit of earlier filing date and right of priority to Korean Patent Application No. 10-2020-0002400, filed on Jan. 8, 2020, the contents of which are hereby incorporated by reference herein in its entirety.

TECHNICAL FIELD

The present disclosure relates to a voice recognition device and a method for learning voice data using the same.

BACKGROUND

As technology develops, various devices and services using a voice recognition technology have been recently introduced in many fields. The voice recognition technology may refer to a series of processes that convert a voice spoken by a person into a command that can be handled by a computer so that the device can understand the person's voice, and the voice recognition service using the voice recognition technology includes a series of processes in which the device recognizes a user's voice and provides a suitable service corresponding to the user's voice.

A voice synthesis technology refers to a speech-to-text (STT) technology that converts text input by a user or manager into a voice recognition device into voice, i.e., audio such as a sound source, and outputs it. The main purpose of the voice synthesis technology was to provide good sound quality voice data, and a synthesized voice also provided a synthesized sound for various input texts based on voice of one person used to train the voice recognition device.

In order for the voice recognition device to recognize human voices well, the voice recognition device needs to learn a large amount of voice learning data. In particular, the large amount of voice learning data refers to voices spoken by various speakers, i.e., data about audio such as a sound source. Since the various speakers have different utterance patterns, a wealth of materials and data on these patterns are needed.

However, in reality, it takes a lot of time and effort to generate voice data by recruiting hundreds of speakers, i.e., a large number of people and allowing them to speak a voice suitable for the learning purpose to record it. That is, each time the content of an utterance is changed due to changes in a scenario, a great deal of time, effort, and money were required in the process of recording and storing the content of the utterance spoken by the large number of people.

SUMMARY

An object of the present disclosure is to address the above-described and other needs and/or problems.

Another object of the present disclosure is to provide a voice recognition device and a method thereof capable of increasing voice recognition efficiency by autonomously generating learning data for voice recognition and learning the generated learning data.

Another object of the present disclosure is to provide a voice recognition device and a method thereof capable of generating substantially the same synthesized voice as that spoken by various speakers using a voice synthesis technology and providing the voice recognition device with the synthesized voice as learning data.

In one aspect of the present disclosure, there is provided a voice recognition device comprising a voice synthesis unit configured to receive a first text input by a user and additional information on a speaker and generate a first audio for the first text, a first database configured to store the first audio as first learning data, a second database configured to store a second text that has entered in the past or been previously stored and a second audio for the second text, as second learning data, a voice recognition unit configured to respectively receive and learn the first learning data and the second learning data from the first database and the second database and recognize the first audio as a voice, and a data learning unit configured to train the voice synthesis unit and the voice recognition unit, wherein the additional information includes first information and second information on the speaker.

The first information may include tag information about a gender and age of the speaker, whether the speaker uses a dialect, and a type of the dialect used. The second information may include numerical information that represents a feeling, an utterance sound size, an utterance speed, a type and a size of a noise, an intonation, an accent, and a tone when the speaker speaks.

The data learning unit may include a first voice synthesis model. The first voice synthesis model may be configured to receive and learn the first text, the additional information, and the second audio as learning data and generate a third audio for the first text according to a learning result.

The first voice synthesis model may include a first encoder unit configured to receive and encode the first text, the additional information, and the second audio, a first neural network model configured to receive and learn first encoding data encoded by the first encoder unit, and a first decoder unit configured to decode sound source data derived as a learning result of the first neural network model and generate the third audio.

The data learning unit may further include a second voice synthesis model. The first voice synthesis model may provide the second voice synthesis model with the third audio as learning data.

The second voice synthesis model may include a second encoder unit configured to receive and encode the first text, the additional information, the second audio, and the third audio, a second neural network model configured to receive and learn second encoding data encoded by the second encoder unit, and a second decoder unit configured to decode sound source data derived as a learning result of the second neural network model and generate a fourth audio.

The voice synthesis unit may further include a first verification module. The first verification module may be configured to determine whether there is a word that is missing from the first audio or is repeated in the first audio.

The voice synthesis unit may further include a second verification module. The second verification module may include a sound quality estimation model configured to learn the first audio and estimate a sound quality of the first audio.

In another aspect of the present disclosure, there is provided a method for learning voice data using a voice recognition device, the method comprising inputting a first text and additional information to the voice recognition device, generating a first audio by the voice recognition device based on the first text and the additional information, storing the first audio as first learning data in a first database, inputting the first learning data to a voice recognition unit, inputting a second audio stored in a second database, as second learning data, to the voice recognition unit, learning the first learning data and the second learning data by the voice recognition unit, and recognizing the first audio and the second audio by the voice recognition unit.

Inputting the first text and the additional information to the voice recognition device may comprise inputting the first text and the additional information to a first voice synthesis model, and inputting the first text and the additional information to a voice synthesis unit.

Inputting the first text and the additional information to the first voice synthesis model may comprise encoding the first text and the additional information in a first encoding unit to generate first encoding data, learning the first encoding data by a first neural network model, generating sound source data as a result of learning the first encoding data by the first neural network model, and decoding the sound source data by a first decoder unit to generate a third audio.

The method may further comprise, after decoding the sound source data by the first decoder unit to generate the third audio, inputting the second audio and the third audio to a second voice synthesis model, and learning the first text, the additional information, the second audio, and the third audio by the second voice synthesis model to generate a fourth audio.

Encoding the first text and the additional information in the first encoding unit to generate the first encoding data may comprise inputting the second audio stored in the second database to the first encoding unit, and encoding the second audio by the first encoding unit to include the encoded second audio in the first encoding data.

Generating the first audio by the voice recognition device based on the first text and the additional information may comprise inputting the first text and the first audio to a first verification module, and verifying, by the first verification module, whether there is a text content that is missing from the first audio or is repeated in the first audio.

The method may further comprise, after verifying, by the first verification module, whether there is a text content that is missing from the first audio or is repeated in the first audio, inputting the first audio and sound quality measurement result data for the first audio to a second verification module, generating a sound quality measurement value based on the first audio and the sound quality measurement result data for the first audio, generating a sound quality estimation value for the first audio, and comparing the sound quality estimation value and the sound quality measurement value of the first audio by the second verification module.

Since the voice recognition device according to the present disclosure itself generates voice learning data by a synthesized voice, it can save cost, time and effort, compared to a method of collecting voices spoken by multiple people and generating voice learning data.

Since the voice recognition device according to the present disclosure receives information of various speakers and generates a synthesized voice based on the information, it can generate various utterances that reflects factors such as gender and age of the speaker, whether the speaker uses a dialect, intonation, accent, and tone. Hence, the voice recognition device according to the present disclosure can greatly improve its learning ability and voice recognition ability by learning various voice learning data.

If the voice recognition device according to the present disclosure performs model training for a new domain, it generates vocalizations for new vocabulary and thus can achieve a more accurate voice recognition performance than other devices.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
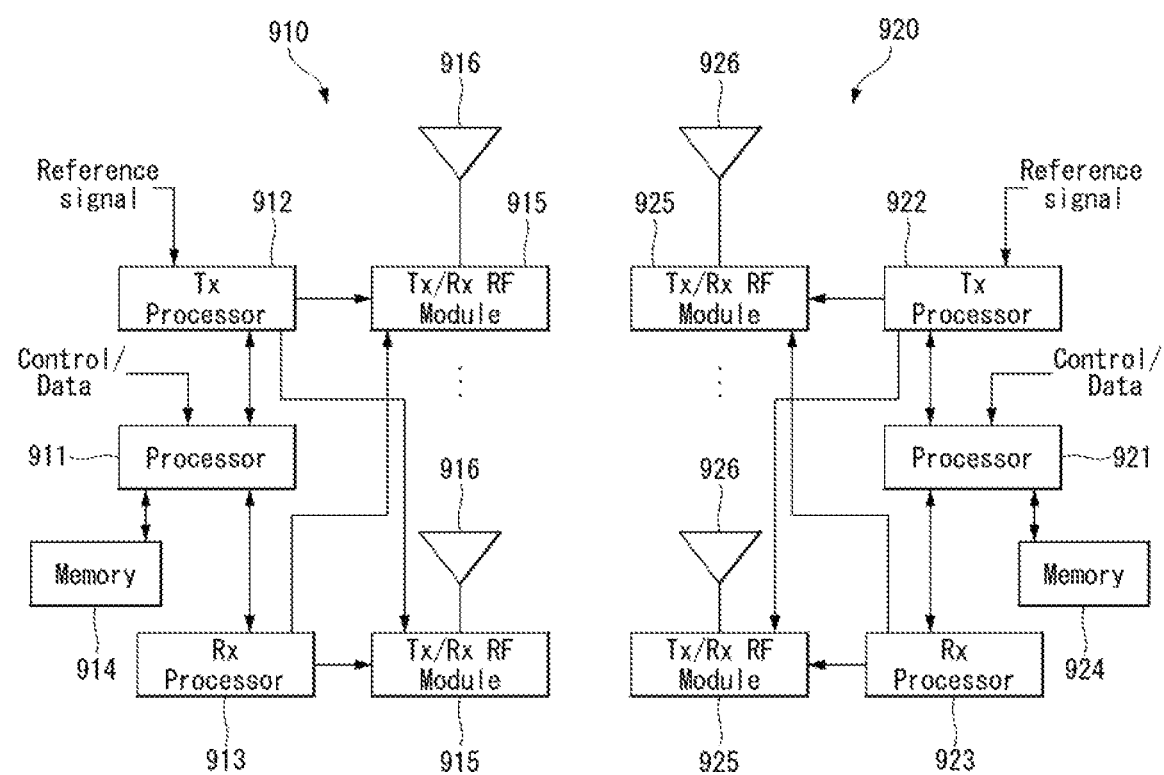
FIG. 1 is a block diagram illustrating configuration of a wireless communication system to which methods described in the present disclosure are applicable.

FIG. 1 is a block diagram of a wireless communication system to which methods proposed in the disclosure are applicable.

Referring to FIG. 1, a device (AI device) including an AI module is defined as a first communication device 910 (see FIG. 1), and a processor 911 can perform detailed AI operation.

A 5G network including another device (AI server) communicating with the AI device is defined as a second communication device 920 (see FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
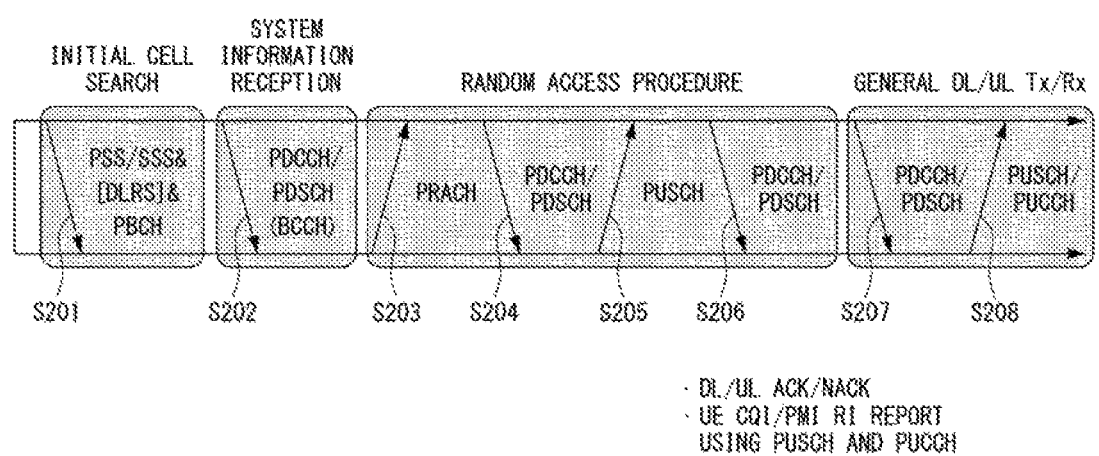
FIG. 2 illustrates an example of a method of transmitting/receiving signals in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
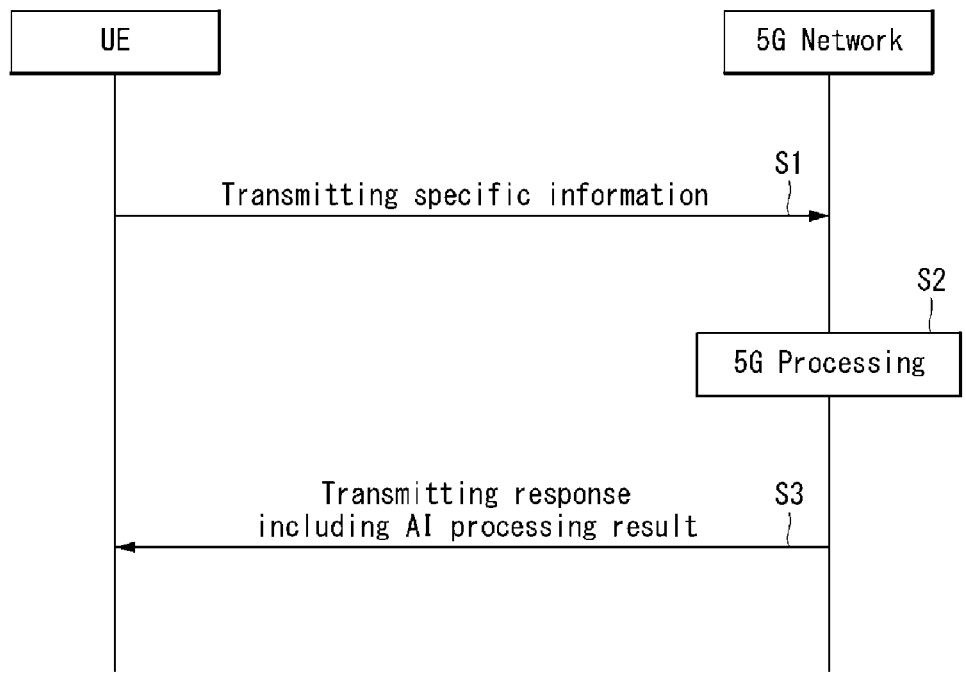
FIG. 3 illustrates an example of a basic operation of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

H. Block Diagram of AI Device

Figure 4:
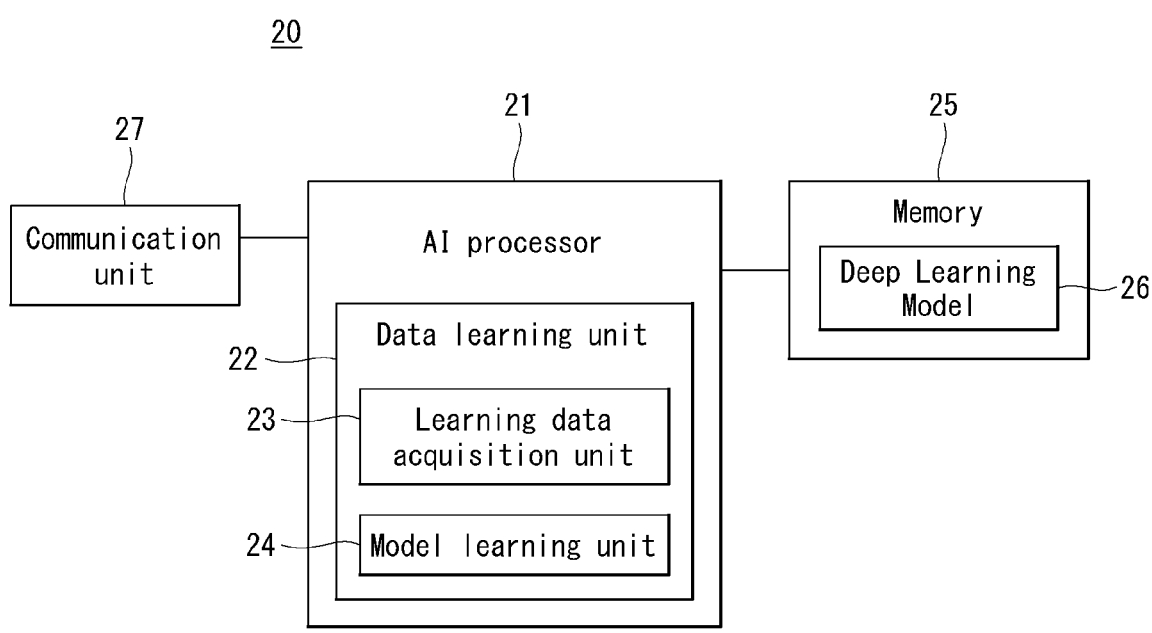
FIG. 4 is a block diagram of an AI device according to an embodiment of the present disclosure.

FIG. 4 is a block diagram of an AI device according to an embodiment of the present disclosure.

An AI device 20 may include an electronic device including an AI module that can perform AI processing, or a server including the AI module, and the like. The AI device 20 may be included as at least a partial configuration of a voice recognition device 100 illustrated in FIG. 5 to perform at least a part of the AI processing.

Figure 5:
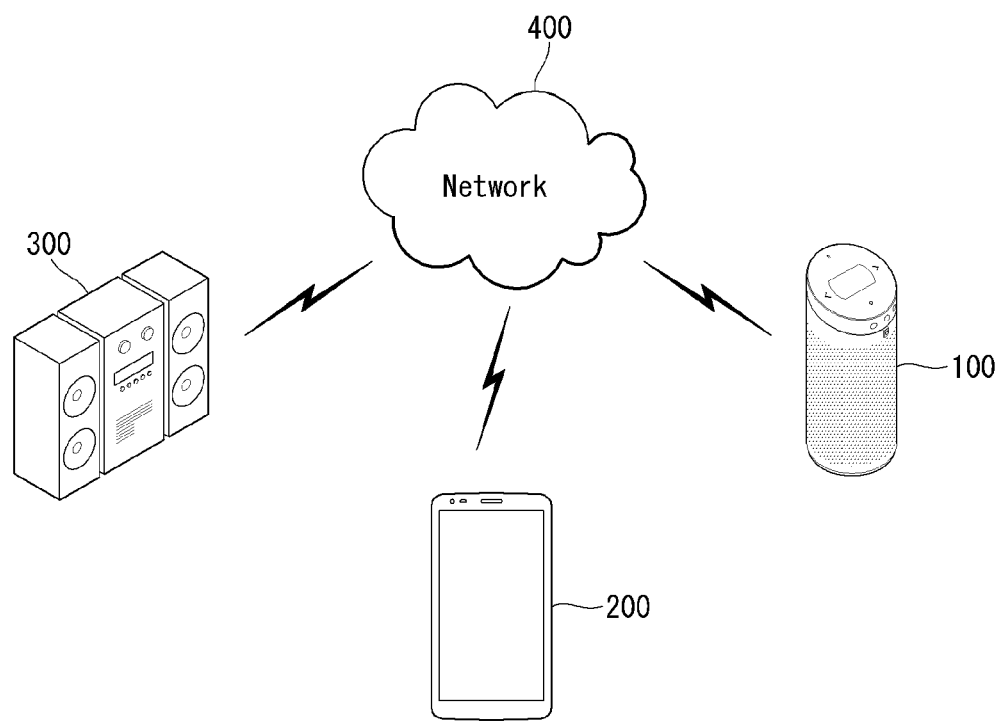
FIG. 5 illustrates a voice recognition system according to the present disclosure.

The AI processing may include all operations related to the control of the voice recognition device 100 illustrated in FIG. 5. For example, if the voice recognition device 100 illustrated in FIG. 5 is an autonomous vehicle, the autonomous vehicle may perform the AI processing on sensing data or driver data to perform a processing/determination operation and a control signal generation operation. The autonomous vehicle may also perform the autonomous driving control by performing AI processing on data acquired through an interaction with other electronic devices included inside the autonomous vehicle.

Referring to FIG. 4, the AI device 20 may include an AI processor 21, a memory 25, and/or a communication unit 27.

The AI device 20 is a computing device capable of learning a neural network and may be implemented as various electronic devices including a server, a desktop PC, a notebook PC, a tablet PC, and the like.

The AI processor 21 may learn a neural network using a program stored in the memory 25. In particular, the AI processor 21 may learn a neural network for recognizing data related to device. Herein, the neural network for recognizing data related to device may be designed to emulate a human brain structure on a computer and may include a plurality of network nodes with weights that emulate neurons in a human neural network. The plurality of network nodes may send and receive data according to each connection relationship so that neurons emulate the synaptic activity of neurons sending and receiving signals through synapses. Herein, the neural network may include a deep learning model which has evolved from a neural network model. In the deep learning model, a plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/write/modify/delete/update data. Further, the memory 25 may store a neural network model (e.g., deep learning model 26) created by a learning algorithm for data classification/recognition according to an embodiment of the present invention.

The AI processor 21 may further include a data learning unit 22 for learning a neural network for data classification/recognition. The data learning unit 22 may learn criteria as to which learning data is used to determine the data classification/recognition and how to classify and recognize data using learning data. The data learning unit 22 may learn a deep learning model by acquiring learning data to be used in the learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 20. Further, the data learning unit 22 may be implemented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data and/or sample data of the vehicle to be input to a neural network model.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process acquired data so that the acquired data can be used in learning for determining the situation. For example, the learning data pre-processing unit may process acquired learning data into a predetermined format so that the model learning unit 24 can use the acquired learning data in learning for recognizing images.

Moreover, the learning data selection unit may select data required for learning among learning data acquired by the learning data acquisition unit 23 or learning data pre-processed by the pre-processing unit. The selected learning data may be provided to the model learning unit 24. For example, the learning data selection unit may detect a specific area in an image obtained by a camera of the vehicle to select only data for objects included in the specific area as learning data.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may send an external electronic device a result of the AI processing by the AI processor 21.

Herein, the external electronic device may be defined as an autonomous vehicle. The AI device 20 may be defined as another vehicle or a 5G network that communicates with the autonomous vehicle. The AI device 20 may be implemented by being functionally embedded in an autonomous module included in the autonomous vehicle. The 5G network may include a server or a module that performs an autonomous related control.

Although the AI device 20 illustrated in FIG. 4 is functionally separately described into the AI processor 21, the memory 25, the communication unit 27, etc., the above components may be integrated into one module and referred to as an AI module.

Referring to FIG. 5, a voice recognition system according to an embodiment of the present disclosure includes a voice recognition device 100, a user terminal 200, a server 300 and a network connecting them to each other. The network may be configured to correspond to the 5G communication standard described above. FIG. 5 illustrates a voice recognition system according to an embodiment of the present disclosure.

In addition to the devices illustrated in FIG. 5, various other electronic devices used in a home or office may be connected to each other and operate under the Internet of Things.

The voice recognition device 100 may receive a user's utterance and provide a voice recognition service through recognition and analysis. In the present embodiment, the voice recognition device 100 may include various electronic devices capable of performing voice recognition functions such as an artificial intelligence (AI) speaker or a communication robot. In addition, the voice recognition device 100 may serve as a hub for controlling electronic devices without a voice input/output function.

The voice recognition service may include an output that receives a user's utterance to distinguish a starting word from the utterance and allows the user to recognize a result of processing a voice recognizer for the utterance.

The utterance means the smallest unit of communication in discourse-text linguistics. The starting word is a specific command for activating the voice recognition function of the voice recognition device 100, and may be referred to as a wake-up word. The voice recognition function may be activated only when the wake-up word is included in the utterance, and the voice recognition function remains inactive (e.g., sleep mode) when the wake-up word is not included in the utterance. The wake-up word may be set in advance and stored in a memory 160 embedded in the voice recognition device 100.

After the voice recognition function of the voice recognition device 100 is activated by the wake-up word, the utterance spoken by the user may consist as voice commands that the voice recognition device 100 can substantially process and generate an output.

For example, when the entire utterance of the user is "Hi LG, turn on the air conditioner", the wake-up word may be "Hi LG", and a voice command may be "turn on the air conditioner". In this case, the voice recognition device 100 receives and analyzes the user's utterance to determine the existence of the wake-up word, and executes the utterance to control the air conditioner (not shown) as an electronic device.

In the present embodiment, the voice recognition device 100 determines a temporary pause for reception of a first utterance during the reception of the first utterance in a state in which the voice recognition function is activated after receiving the wake-up word. In addition, the voice recognition device 100 outputs a voice recognition processing result of a second utterance received after the temporary pause, separately from the first utterance, determines a third utterance received after outputting the voice recognition result of the second utterance as an extension of the first utterance, and determines intention of the third utterance. Thereafter, when combining the first and third utterances, the voice recognition device 100 combines a word or information that is identically expressed in the first and third utterances so as not to overlap them, and generates a user voice command based on this. In addition, the voice recognition device 100 may output the result by performing the voice recognition processing based on the user voice command.

The first utterance may include a first voice command that is spoken after the user speaks the wake-up word, and the first utterance may include an incomplete utterance. The second utterance may include a second voice command that is spoken after the temporary pause of the first utterance is determined, and the second utterance may include a completed utterance. The third utterance may include a third voice command spoken by the user after outputting the voice recognition processing result of the second utterance, and the third utterance is a voice command that is an extension of the first utterance, and may also include an incomplete utterance. The user voice command grasps intentions of the incomplete first utterance and the incomplete third utterance and includes a completed utterance combining the first and third utterances.

In the present embodiment, the complete utterance includes a voice command capable of outputting the voice recognition processing result. The incomplete utterance includes a voice command that cannot output the voice recognition processing result.

In the present embodiment, when the voice recognition function is activated by receiving the wake-up word from the user, the voice recognition device 100 converts a voice command received from the user, that is, an utterance, into a text using an acoustic model (not shown) and a language model (not shown) stored therein.

The voice recognition device 100 grasps the intention of the utterance by performing syntactic analysis or semantic analysis on the converted text, converts it into a text in natural language utterance form to generate it, and converts the text in natural language utterance form into voice information to output the voice recognition processing result.

In addition, the voice recognition device 100 may transmit the utterance to the server 300 and receive and output the voice recognition processing result from the server 300, in addition to the method of self-voice recognition processing as described above.

The user terminal 200 may be provided with a service capable of monitoring status information of the voice recognition device 100, or driving or controlling the voice recognition device 100 through an authentication process after accessing a voice recognition driving application or a voice recognition driving site. The user terminal 200 that has completed the authentication process in the present embodiment, for example, when receiving the user voice command, may determine an operation mode of the voice recognition device 100 to operate the voice recognition device 100 or control the operation of the voice recognition device 100.

The user terminal 200 may include a communication terminal capable of performing a function of a computing device (not shown), and the user terminal 200 in the present embodiment may be a desktop computer, a smartphone, a laptop, a tablet PC, a smart TV, a mobile phone, a personal digital assistant (PDA), a laptop, a media player, a micro server, a global positioning system (GPS) device, an e-book terminal, a digital broadcasting terminal, a navigation, a kiosk, an MP3 player, a digital camera, a home appliance, and other mobile or non-mobile computing devices, which are operated by a user, but is not limited thereto.

In addition, the user terminal 200 may be a wearable terminal such as a watch, glasses, a hair band, and a ring having a communication function and a data processing function. The user terminal 200 is not limited to the above, and any terminal capable of web browsing may be included in the user terminal 200.

The server 300 may be a database server that provides big data required to apply various artificial intelligence algorithms and data related to voice recognition. In addition, the server 300 may include a web server or an application server that allows the voice recognition device 100 to be remotely controlled using an application or a web browser installed on the user terminal 200.

When the voice recognition device 100 receives the wake-up word and activates the voice recognition function, and then transmits a subsequently received utterance to the server 300 without processing the received utterance by itself, the server 300 determines whether a temporary pause has occurred in a first utterance from the voice recognition device 100.

If the server 300 determines that the temporary pause has occurred in the first utterance, the server 300 receives the second utterance from the voice recognition device after the temporary pause, generates a voice recognition processing result for the second utterance, and transmits the result to the voice recognition device 100. The voice recognition device 100 outputs the voice recognition processing result of the second utterance, and transmits the third utterance received from the user to the server 300. The server 300 determines the third utterance as an extension of the first utterance, generates a voice recognition processing result for a fourth utterance combining the first utterance and the third utterance, and transmits the result to the voice recognition device 100. In addition, the voice recognition device 100 outputs the voice recognition processing result for the fourth utterance.

A network 400 may serve to connect the voice recognition device 100 and the user terminal 200. The network 400 may include, for example, a wired network such as local area networks (LANs), wide area networks (WANs), metropolitan area networks (MANs), and integrated service digital networks (ISDNs), or a wireless network such as wireless LANs, CDMA, Bluetooth, and satellite communications, but the present disclosure is not limited thereto.

In addition, the network 400 may transmit and receive information using short-range communication and/or long-distance communication. The short-range communication may include Bluetooth, radio frequency identification (RFID), infrared data association (IrDA), ultra-wideband (UWB), ZigBee, and wireless fidelity (Wi-Fi) technology, and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) technology.

The network 400 may include connections of network elements such as hubs, bridges, routers, switches and gateways. The network 400 may include one or more connected networks, including a public network such as the Internet and a private network such as a secure corporate private network, for example, a multiple network environment. Access to the network 400 may be provided via one or more wired or wireless access networks. Furthermore, the network 400 may support an Internet of Things (IoT) network that exchanges and processes information between distributed components, such as objects, and/or 5G communication.

Figure 6:
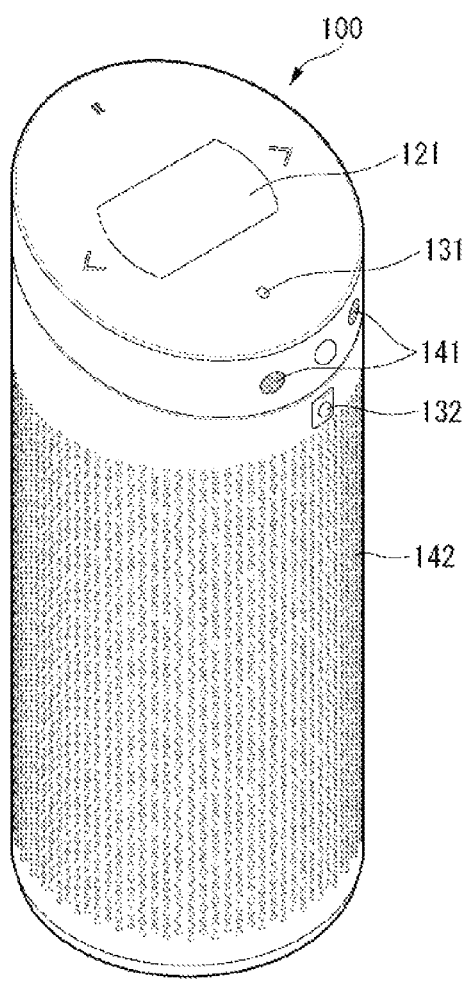
FIG. 6 illustrates an appearance of a voice recognition device according to an embodiment of the present disclosure.
Figure 7:
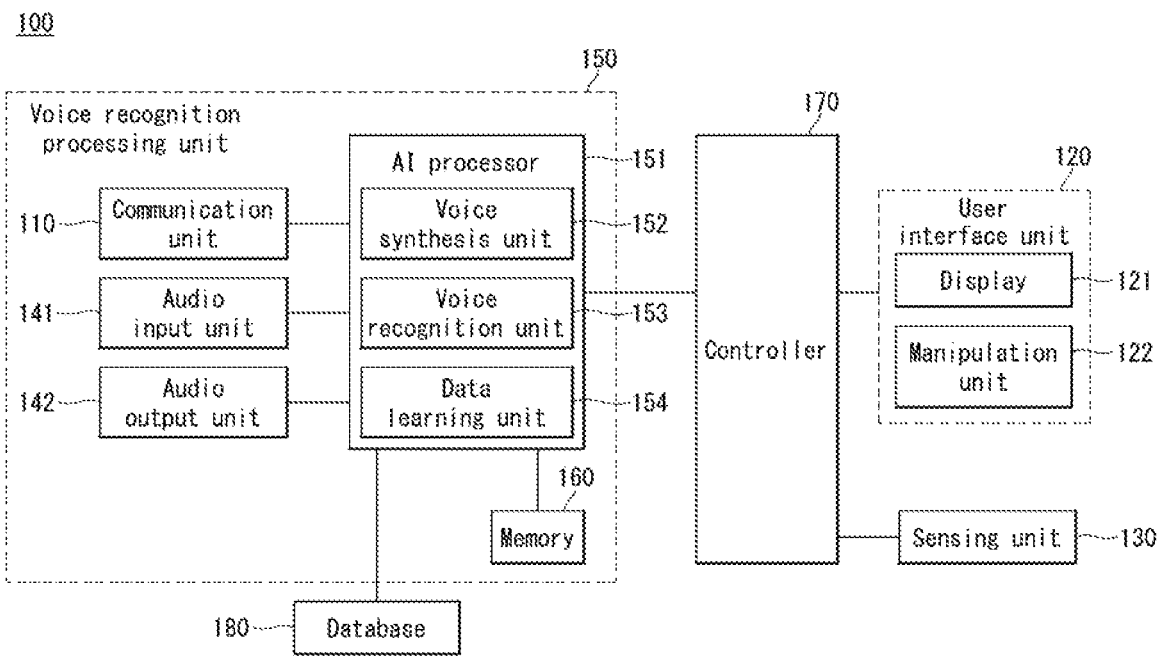
FIG. 7 is a block diagram illustrating configuration of a voice recognition device according to an embodiment of the present disclosure.

FIG. 6 illustrates an appearance of a voice recognition device according to an embodiment of the present disclosure. FIG. 7 is a block diagram illustrating configuration of a voice recognition device according to an embodiment of the present disclosure.

Referring to FIGS. 6 and 7, the voice recognition device 100 includes a communication unit 110, a user interface unit 120 including a display 121 and a manipulation unit 122, a sensing unit 130, an audio input unit 141, an audio output unit 142, a voice recognition processing unit 150, a memory 160, a controller 170, and a database 180. The voice recognition processing unit 150 may further include an AI processor 151, and the voice recognition processing unit 150 including the communication unit 110, the audio input unit 141, the audio output unit 142, the memory 160, and the AI processor 151 may be referred to as a voice recognition module. The voice recognition processing unit may be modularized.

The voice recognition processing unit 150 includes the communication unit 110 that transmits drive signals and/or various information corresponding to voice commands to the user terminal 200 and/or the server 300, the audio input unit 141 that receives an utterance voice, the audio output unit 142 that outputs a voice recognition processing result as an audio, and the AI processor 151 that analyzes the voice commands using a voice recognition algorithm and generates the voice recognition processing result. The voice recognition processing unit 150 can analyze and process more efficiently the voice recognition and the voice recognition processing result.

The AI processor 151 included in the voice recognition processing unit 150 does not necessarily have to be configured with the AI processor, but may be configured with a general processor. However, for convenience of explanation, an example is given below in which the AI processor 151 is configured with the AI processor. The AI processor 151 according to the present embodiment may learn data for all voices collected by the voice recognition device 100 using a deep neural network (DNN), i.e., a neural network model.

The communication unit 110 may provide a communication interface required to provide a signal, that is transmitted and received between the voice recognition device 100 and other electronic devices and/or the user terminal 200 and/or the server 300, in the form of packet data in conjunction with the network 400. Furthermore, the communication unit 110 may serve to receive a predetermined information request signal from the electronic device and/or the user terminal 200 and serve to transmit information processed by the voice recognition device 100 to the electronic device and/or the user terminal 200. The communication unit 110 may transmit the predetermined information request signal from the electronic device and/or the user terminal 200 to the server 300, receive a response signal processed by the server 300, and transmit the response signal to the electronic device and/or the user terminal 200. The communication unit 110 may be a device including hardware and software required to transmit and receive control signals or data signals through wired/wireless connection with other network devices.

In the present embodiment, the other electronic devices may include home appliances (e.g., an air conditioner, a refrigerator, a washing machine, etc.) not having a voice input/output function, and the above-described home appliances may be controlled by the voice recognition device 100. Further, home appliances having a voice input/output function may also be included in the other electronic devices.

The communication unit 110 may support machine to machine (M2M) (e.g., Internet of things (IoT), Internet of everything (IoE), Internet of small things (IoST), etc.) and may support vehicle to everything (V2X) communication, device to device (D2D) communication, etc.

The display 121 of the user interface unit 120 may display a driving state of the voice recognition device 100 under the control of the controller 170. According to an embodiment, the display 121 may form a mutual layer structure with a touch pad and may be configured as a touch screen. In this case, the display 121 may be used as the manipulation unit 122 capable of an input of information through a touch of the user. To this end, the display 121 may be configured as a touch recognition display controller or various input/output controllers.

For example, the touch recognition display controller may provide an output interface and an input interface between the device and the user. The touch recognition display controller may transmit and receive an electrical signal to and from the controller 170. Further, the touch recognition display controller may display a visual output to the user, and the visual output may include a text, a graphic, an image, a video, and a combination thereof.

The display 121 may be, for example, a predetermined display member, such as an organic light emitting diode (OLED) display, a liquid crystal display (LCD), or a light emitting diode (LED) display capable of recognizing a touch.

The manipulation unit 122 of the user interface 120 may include a plurality of manipulation buttons (not shown) to transmit a signal corresponding to the input button to the controller 170. The manipulation unit 122 may be configured as a sensor, button or switch structure that can recognize a user's touch or push operation. In the present embodiment, the manipulation unit 122 may send the controller 180 a manipulation signal manipulated by the user so as to check or change various information related to the drive of the voice recognition device 100 displayed on the display 121.

In the present embodiment, the manipulation unit 122 may include a plurality of contact switches (not shown), and how an output signal of each contact switch is processed may be determined by a program that has been previously stored in the memory 160. For example, the plurality of contact switches may include first to fourth contact switches. In response to an operation signal of the first or second contact switch, menus displayed in the left or right direction on the display 121 may be selected. In response to an operation signal of the third or fourth contact switch, menus displayed in the up or down direction on the display 121 may be selected. If one of the first to fourth contact switches operates, the voice recognition function can be activated.

In the present embodiment, the manipulation unit 122 may include a keyboard (not shown) and a touch pad (not shown), and how an output signal of the keyboard and the touch pad is processed may be determined by a program that has been previously stored in the memory 160. The user may input a text using the keyboard and the touch pad.

The sensing unit 130 may include a proximity sensor 131 and an image sensor 132 that sense surrounding situations of the voice recognition device 100. The proximity sensor 131 may acquire location data of an object (e.g., user) located around the voice recognition device 100 by using infrared rays, etc. The location data of the user acquired by the proximity sensor 131 may be stored in the memory 160.

The image sensor 132 may include a camera (not shown) that can take images of surroundings of the voice recognition device 100, and a plurality of cameras may be provided for photographing efficiency. For example, the camera may include at least one optical lens, an image sensor (e.g., CMOS image sensor) including multiple photodiodes (e.g., pixels) that form images by light passing through the optical lens, and a digital signal processor (DSP) that forms images based on signals output from the photodiodes. The digital signal processor may create still images and video consisting of frames comprised of the still images. The images taken by the camera as the image sensor 132 may be stored in the memory 160.

The present embodiment describes the sensing unit 130 by limiting it to the proximity sensor 131 and the image sensor 132, but is not limited thereto. For example, the sensing unit 130 may include at least one of sensors capable of sensing the surrounding situations of the voice recognition device 100, e.g., a lidar sensor, a weight detection sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The voice recognition device 100 in the present embodiment may be configured to combine and utilize information obtained from two or more sensors of these sensors.

The audio input unit 141 and the audio output unit 142 may be together referred to as an audio processing unit. The audio input unit 141 may receive an utterance voice (e.g., wake-up word and voice command) spoken by the user and send it to the controller 170, and the controller 170 may transmit the utterance voice of the user to the voice recognition processing unit 150. To this end, the audio input unit 141 may include one or more microphones (not shown). In order to more accurately receive the utterance voice of the user, the audio input unit 141 may include a plurality of microphones. The plurality of microphones may be disposed to be spaced apart from each other at different positions, and may process the received utterance voice of the user into electrical signals.

For example, the audio input unit 141 may use various noise removal algorithms for removing a noise generated in the process of receiving the utterance voice of the user. As another example, the audio input unit 141 may also include various components for the voice signal processing, including a filter (not shown) removing a noise upon reception of the utterance voice of the user, an amplifier (not shown) that amplifies and outputs signals output from the filter, and the like.

The audio output unit 142 may output, as audio, alert messages such as a warning sound, an operation mode, an operation status, and an error status, information corresponding to a command input of the user, a processing result corresponding to the command input of the user, and the like under the control of the controller 170. The audio output unit 142 may convert an electrical signal from the controller 170 into an audio signal and output it. To this end, the audio output unit 142 may include a speaker, etc.

In the present disclosure, the voice recognition processing unit 150 autonomously learns data for voice through the AI processor 151. However, the voice recognition processing unit 150 may perform learning for voice data in connection with the controller 170, regardless of whether the AI processor 151 is provided. The learning includes learning data related to voice recognition and audio generation.

The voice recognition processing unit 150 according to the present disclosure may send the controller 170 a result of autonomous learning, or receive a result of learning in the controller 170. As illustrated in FIG. 7, in the voice recognition device 100, the voice recognition processing unit 150 is configured separately from the controller 170. However, the present disclosure is not limited to such a configuration, and the voice recognition processing unit 150 may be provided inside the controller 170 and configured to operate together with the controller 170. In addition, the voice recognition processing unit 150 according to the present disclosure may be separated from the controller 170, and may be separately provided inside the server 500 of FIG. 3 not the voice recognition device 100.

However, for convenience of explanation, an example is given below in which the voice recognition processing unit 150 according to the present disclosure is configured separately from the controller 170 inside the voice recognition device 100 as illustrated in FIG. 7.

The voice recognition processing unit 150 is further described later with reference to FIG. 8.

The memory 160 included in the voice recognition device 100 according to the present disclosure is configured to store a variety of information required for the operation of the voice recognition device 100 and may include volatile or non-volatile recording media. For example, the memory 160 may store a wake-up word that has been previously set to determine whether there is the wake-up word in an utterance voice of the user. The wake-up word may be previously set by the manufacturer. For example, "Hi LG" may be set as the wake-up word and may be changed by the user. The wake-up word is input in order to activate the voice recognition function of the voice recognition device 100, and the voice recognition function of the voice recognition device 100 recognizing the wake-up word spoken by the user is switched to an activation state.

The memory 160 may include magnetic storage media or flash storage media, but the scope of the present disclosure is not limited thereto. The memory 160 may include an internal memory and/or an external memory, and may include a volatile memory such as DRAM, SRAM, or SDRAM, a non-volatile memory such as OTPROM (one time programmable ROM), PROM, EPROM, EEPROM, mask ROM, flash ROM, a NAND flash memory, or a NOR flash memory, a flash drive such as a SSD compact flash (CF) card, a SD card, a micro-SD card, a mini-SD card, a Xd card, or a memory stick, or a storage device such as HDD.

The controller 170 may transmit the utterance voice received via the audio input unit 141 to the voice recognition processing unit 150, and provide a voice recognition processing result from the voice recognition processing unit 150 as visual information through the display 121 or as audio information through the audio output unit 142.

The controller 170 may control the entire operation of the voice recognition device 100 by driving control software mounted in the memory 160 as a kind of central processing unit.

The controller 170 may include all kinds of devices capable of processing data like a processor. Herein, the 'processor' may refer to a data processing device, which has a physically structured circuit to perform a function represented by codes or instructions included in a program and is embedded in hardware. Examples of the data processing device embedded in the hardware may include a microprocessor, a central processing unit (CPU), a processor core, a multiprocessor, an application-specific integrated circuit (ASIC), a field programmable gate array (FPGA), etc., but the scope of the present disclosure is not limited thereto.

The controller 170 may perform machine learning, such as deep learning, for an utterance voice of the user so that the voice recognition device 100 outputs an optimum voice recognition processing result, and the memory 160 may store data used in the machine learning, result data, etc.

The controller 170 may be equipped with an artificial neural network, and may recognize a user and a user's tone based on the machine learning using a received voice input signal as input data.

The controller 170 may include the artificial neural network, for example, the deep neural network (DNN) such as CNN, RNN, and DBN, and may learn data for all the voices collected by the voice recognition device 100 in the deep neural network. The machine learning method of the artificial neural network may use both unsupervised learning and supervised learning. The controller 170 may also update the existing the artificial neural network structure after data learning for the voice according to the setting.

The database 180 may mean a storage medium and may store data for voice. Herein, the data for voice includes both audio data recording a voice spoken by a person and data that represents contents included in the voice in text.

The controller 170 or the voice recognition processing unit 150 may acquire the data for voice from the database 180. All the data for voice that is recognized, learned, and processed by the controller 170 or the voice recognition processing unit 150 may be stored in the database 180.

Figure 8:
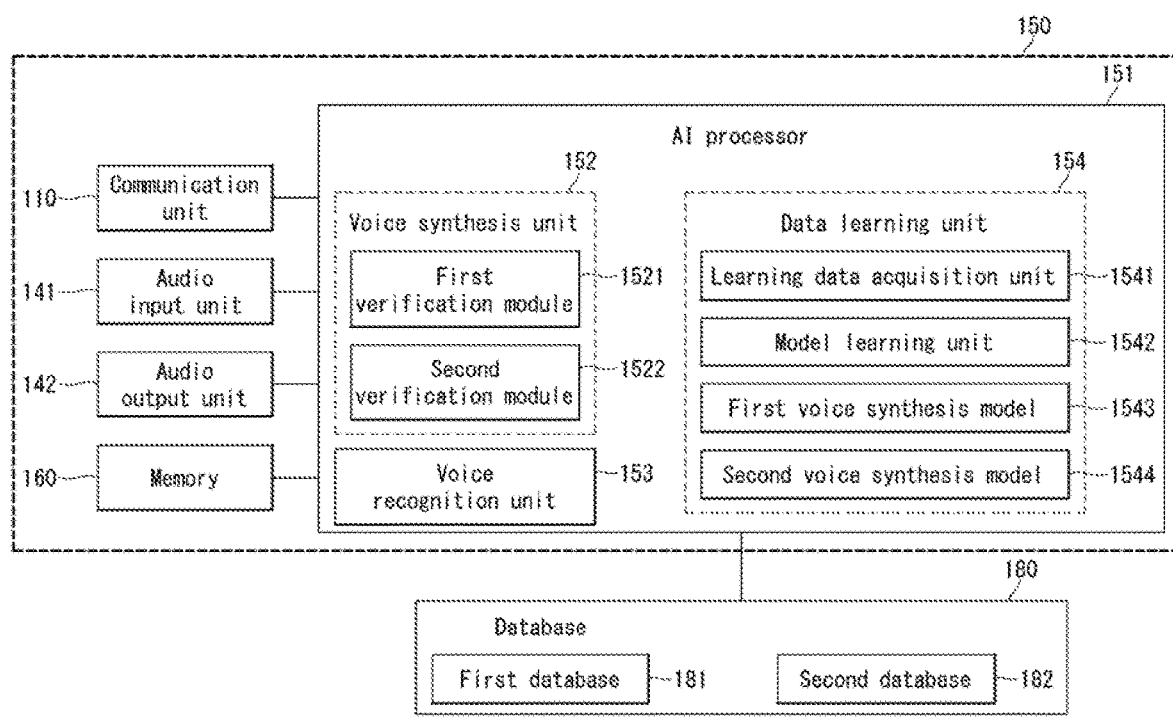
FIG. 8 is a block diagram illustrating detailed configuration of a voice recognition processing unit illustrated in FIG. 7.

With reference to FIG. 8, the voice recognition processing unit 150 according to an embodiment of the present disclosure is described in more detail below. FIG. 8 is a block diagram illustrating detailed configuration of the voice recognition processing unit illustrated in FIG. 7.

The description of the configuration and the structure of the voice recognition processing unit 150 identical or equivalent to those described above will be omitted. In addition, since the AI processor 151 included in the voice recognition processing unit 150 can have substantially the same function and effect as the AI processor 21 described with reference to FIG. 4, the description of the configuration and the structure of the AI processor 151 identical or equivalent to the AI processor 21 described with reference to FIG. 4 will be omitted.

Referring to FIG. 8, the AI processor 151 according to the present embodiment includes a voice synthesis unit 152, a voice recognition unit 153, and a data learning unit 154.

The voice synthesis unit 152 receives a first text input by a user or a manager of the voice recognition device 100 and additional information on a speaker speaking the first text and generates a first audio for the first text. That is, the voice synthesis unit 152 performs a text-to-speech function.

The first text refers to a text that the user or the manager using the voice recognition device 100 inputs to the voice recognition device 100 in order to convert the text into an audio, and the additional information refers to information on a speaker who speaks or will speak the first text. The information on the speaker is as follows.

The information on the speaker includes information about gender and age of the speaker, whether the speaker uses a dialect, and a type of the dialect used, and information about a feeling, an utterance sound size, an utterance speed, a type and size of noise, an intonation, an accent, and a tone when the speaker speaks. In the present embodiment, the information on the speaker may be divided into first information and second information.

In this case, the first information includes information, that represents gender and age of the speaker, whether the speaker uses a dialect, and a type of the dialect used, in tag. The second information includes information, that represents the feeling, the utterance sound size, the utterance speed, the type and size of noise, the intonation, the accent, and the tone when the speaker speaks, in number.

The database 180 according to the present embodiment includes a first database 181 and a second database 182.

The first database 181 is a database storing the first audio generated by the voice synthesis unit 152. All audio data stored in the first database 181 may be used as learning data for audio generation, i.e., voice synthesis of the voice synthesis unit 152 and used as learning data for voice recognition of the voice recognition unit 153.

The second database 182 is a database storing wake-up words required for the operation of the voice recognition device 100 that is set by the manager, as initial voice data stored when manufacturing the voice recognition device 100. The second database 182 may store a usage history of the voice recognition device 100, and store voice data, that the user or the manager has entered or recognized in the past, according to the usage history.

The second database 182 stores both data for audio spoken by a person and text data that represents contents included in audio data in text. The second database 182 may provide the voice synthesis unit 152 and the voice recognition unit 153 with voice data, which has been stored in the second database 182, as learning data.

The second database 182 is a storage for voice related data which has been previously stored, and the first database 181 is a storage storing voice related data which is newly generated by the voice synthesis unit 152. Therefore, in order to distinguish data stored in the two databases, the following is described taking an example in which a first audio and a first text are stored in the first database 181, and a second audio and a second text are stored in the second database 182.

The learning data provided by the first database 181 is referred to as first learning data, and the learning data provided by the second database 182 is referred to as second learning data. The learning data may include all data related to voice, and includes the above-described audio data and text data for the corresponding audio.

The voice recognition unit 153 respectively receives first learning data and second learning data from the first and second databases 181 and 182, learns data related to voice, and recognizes first audio based on a result of learning.

The data learning unit 154 includes an artificial neural network model to train the voice synthesis unit 152 and the voice recognition unit 153. In particular, the data learning unit 154 includes a learning data acquisition unit 1541, a model learning unit 1542, and a first voice synthesis model 1543 to train the voice synthesis unit 152 and the voice recognition unit 153.

Since the learning data acquisition unit 1541 and the model learning unit 1542 according to the present embodiment are configured to have substantially the same function and effect as the learning data acquisition unit 23 and the model learning unit 24 described with reference to FIG. 4, a detailed description thereof is omitted.

A modification of the data learning unit 154 according to the present embodiment may further include a second voice synthesis model 1544 in addition to the first voice synthesis model 1543.

The first voice synthesis model 1543 and the second voice synthesis model 1544 may be equally configured, and are described later with reference to FIGS. 11 to 15.

Referring again to FIG. 8, it illustrates that the voice recognition processing unit 150 according to the present embodiment includes the voice synthesis unit 152, the voice recognition unit 153, and the data learning unit 154 in one AI processor 151.

However, the voice recognition processing unit 150 according to the present disclosure is not limited to the above configuration.

Figure 9:
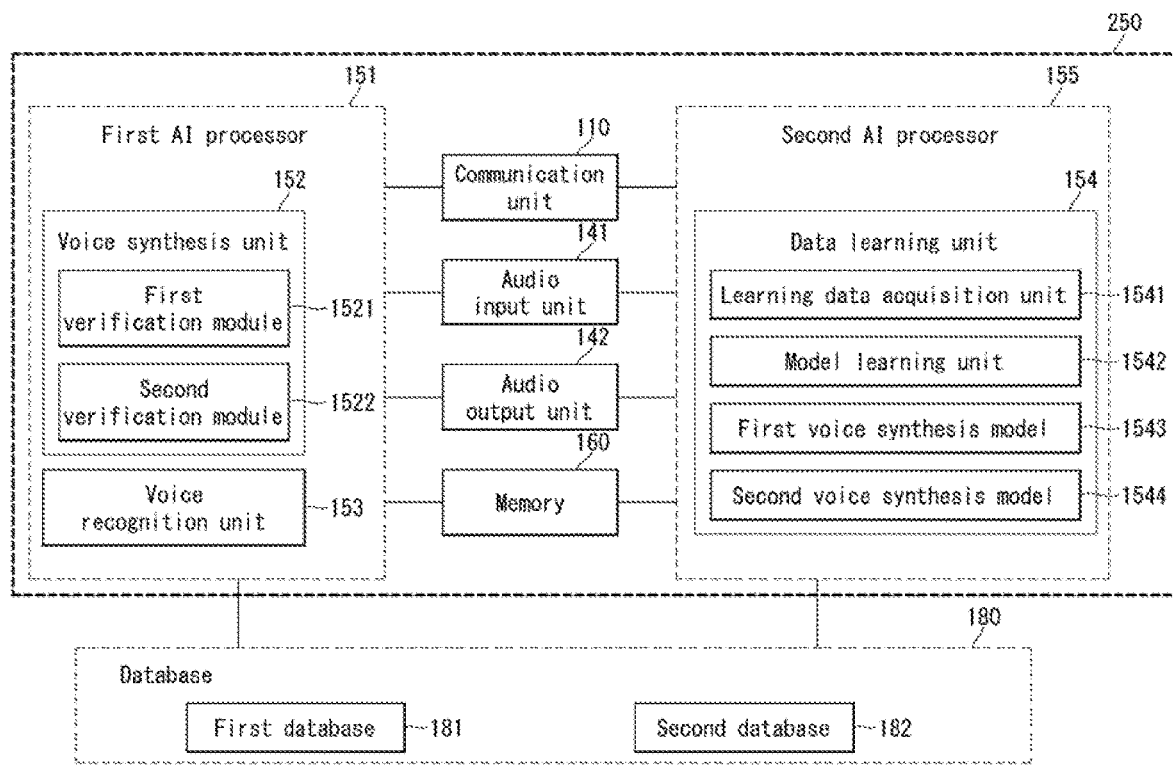
FIG. 9 is a block diagram illustrating configuration of a voice recognition processing unit according to another embodiment of the present disclosure.

As illustrated in FIG. 9, a voice recognition processing unit 250 according to another embodiment of the present disclosure may include at least two AI processors 151 and 155.

FIG. 9 is a block diagram illustrating configuration of the voice recognition processing unit 250 according to another embodiment of the present disclosure.

In this case, the at least two AI processors 151 and 155 may include a first AI processor 151 and a second AI processor 155. The first AI processor 151 may include a voice synthesis unit 152 and a voice recognition unit 153, and the second AI processors 155 may include a data learning unit 154.

If the voice recognition processing unit 250 includes the AI processors 151 and 155, an amount of computation that each AI processor has to perform can be reduced, and a large amount of complex data can be processed and learned at a very high speed because the plurality of AI processors are disposed in parallel to perform the computations.

Accordingly, the voice recognition processing unit 250 according to another embodiment of the present disclosure can perform the voice recognition, the voice generation, and learning and processing data related to voice more quickly and efficiently than the voice recognition processing unit 150 according to an embodiment of the present disclosure.

FIG. 9 illustrates that the voice recognition processing unit 250 includes the two AI processors 151 and 155, but this is merely an example. For example, the voice recognition processing unit 250 can be configured to include three AI processors so that the voice synthesis unit 152, the voice recognition unit 153, and the data learning unit 154 are respectively subject to AI processors.

Furthermore, it may be configured so that each of the components included in the voice synthesis unit 152, the voice recognition unit 153, and the data learning unit 154 is assigned to one AI processor. For example, it may be configured so that the first and second voice synthesis models 1543 and 1544 included in the data learning unit 154 are respectively included in a third AI processor (not shown) and a fourth AI processor (not shown).

The voice recognition processing unit 250 is a conceptual configuration used to express the plurality of individual components as one module or a modularized configuration, and thus all the components included in the voice recognition processing unit 250 do not have to be included in one device.

Thus, if the voice recognition processing unit 250 is configured to include the plurality of AI processors as described above, the respective AI processors may be modularized and implemented as other devices in addition to the voice recognition device 100. That is, as described above, if the voice recognition processing unit 250 is configured to include the first to fourth AI processors, the first and second AI processors 151 and 155 may be configured to be included in the voice recognition device 100, and the third and fourth AI processors (not shown) may be configured to be included in a separate device from the voice recognition device 100. The voice recognition device 100 may be configured to transmit and receive and learn a processing result of the first and second AI processors 151 and 155 and a processing result of the third and fourth AI processors via data communication with other devices.

Accordingly, the voice recognition processing unit 250 according to another embodiment of the present disclosure may include at least two AI processors.

Figure 10:
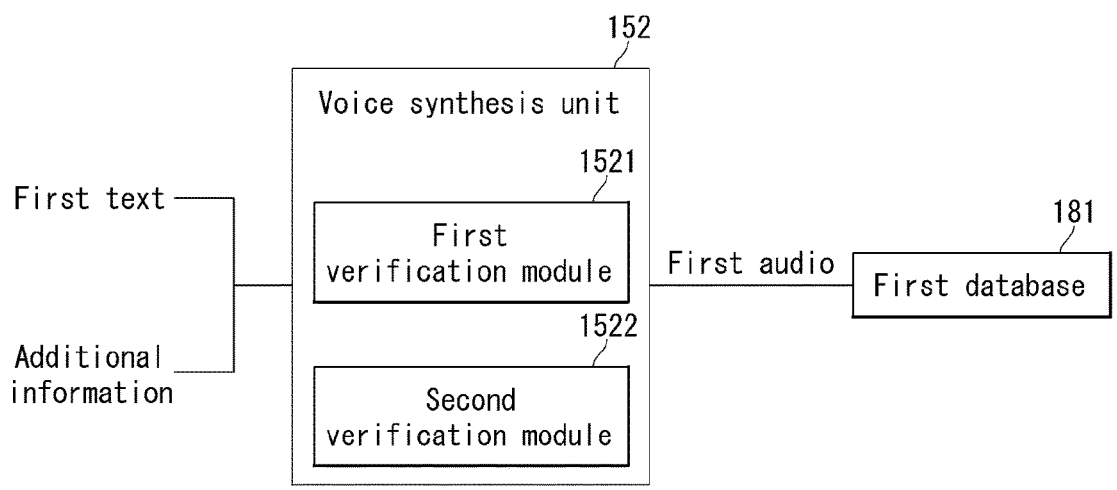
FIG. 10 illustrates a process for a voice synthesis unit according to an embodiment of the present disclosure to generate a synthesized voice using text and additional information.

With reference to FIG. 10, a process for the voice synthesis unit 152 to generate the first audio is described. FIG. 10 illustrates a process for the voice synthesis unit 152 according to an embodiment of the present disclosure to generate a synthesized voice using text and additional information.

Referring to FIG. 10, a first text and additional information are input to the voice synthesis unit 152 according to the present disclosure. The voice synthesis unit 152 converts the first text into a sound source using a TTS function and analyzes the additional information to configure information on a speaker who will speak the converted sound source. For example, if 'I go to school' as the first text is input to the voice synthesis unit 152, the voice synthesis unit 152 converts the text 'I go to school' into a sound source using the TTS function.

In addition, if information representing the speaker being 'Actor Haein JUNG' and 'No dialect spoken' in tag as additional information is input to the voice synthesis unit 152, the voice synthesis unit 152 analyzes the corresponding tag information. If numerical information representing 'Speaker's vocal volume of 10' and 'Utterance speed is 1 word per second' as additional information is input to the voice synthesis unit 152, the voice synthesis unit 152 analyzes the corresponding numerical information and determines an utterance style.

The voice synthesis unit 152 generates the corresponding sound source using a voice of 'Actor Haein JUNG' that has been previously stored in the second database 182, and allows the corresponding sound source to be generated in standard Korean without dialect. Afterwards, the voice synthesis unit 152 allows the corresponding sound source to be spoken based on 'Speaker's vocal volume of 10' and 'Utterance speed is 1 word per second', and generates a first audio.

Accordingly, the first audio is configured to speak one word per second at the vocal volume of 10 and speak the content of 'I go to school' with the voice of 'Actor Haein JUNG' in standard Korean without dialect.

Next, the first audio is stored in the first database 181 via a first verification module 1521 and/or a second verification module 1522.

Next, the first audio stored in the first database 181 as described above is provided to the voice recognition unit 153 as first learning data. The voice recognition unit 153 recognizes and learns the first audio to derive a learning result that a speaker speaking the first audio is 'Actor Haein JUNG', the speaker named 'Haein JUNG' is a man in his 30s, and the first audio has been spoken based on 'Speaker's vocal volume of 10' and 'Utterance speed is 1 word per second'.

The voice synthesis unit 152 further includes the first verification module 1521 and/or the second verification module 1522. They reflect the first text well to examine whether the first audio has been generated, and allow only the first audios that have been reviewed to be stored in the first database 181.

The first verification module 1521 examines whether there is a text that is missing or has the repeated content in the first audio generated by the voice synthesis unit 152, and checks whether the first audio accurately matches the content of the first text.

Figure 11:
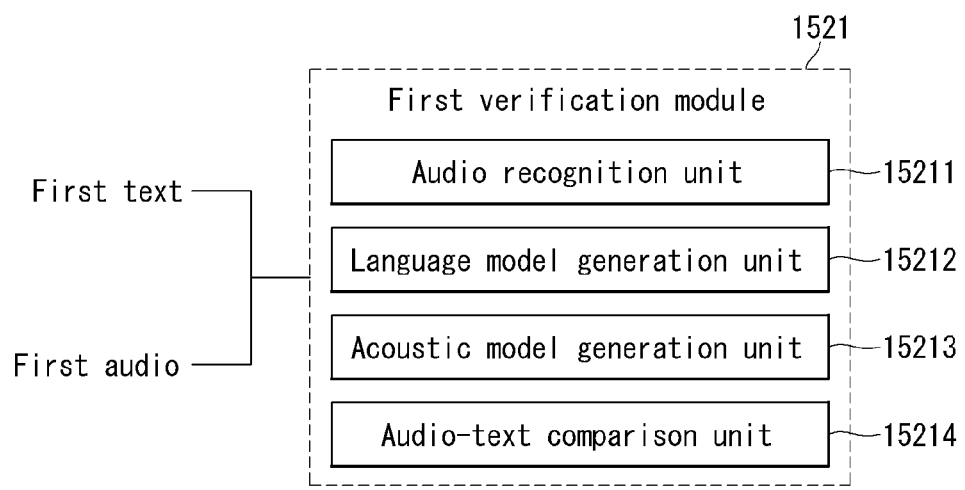
FIG. 11 is a block diagram illustrating configuration of a first verification module according to an embodiment of the present disclosure.
Figure 12:
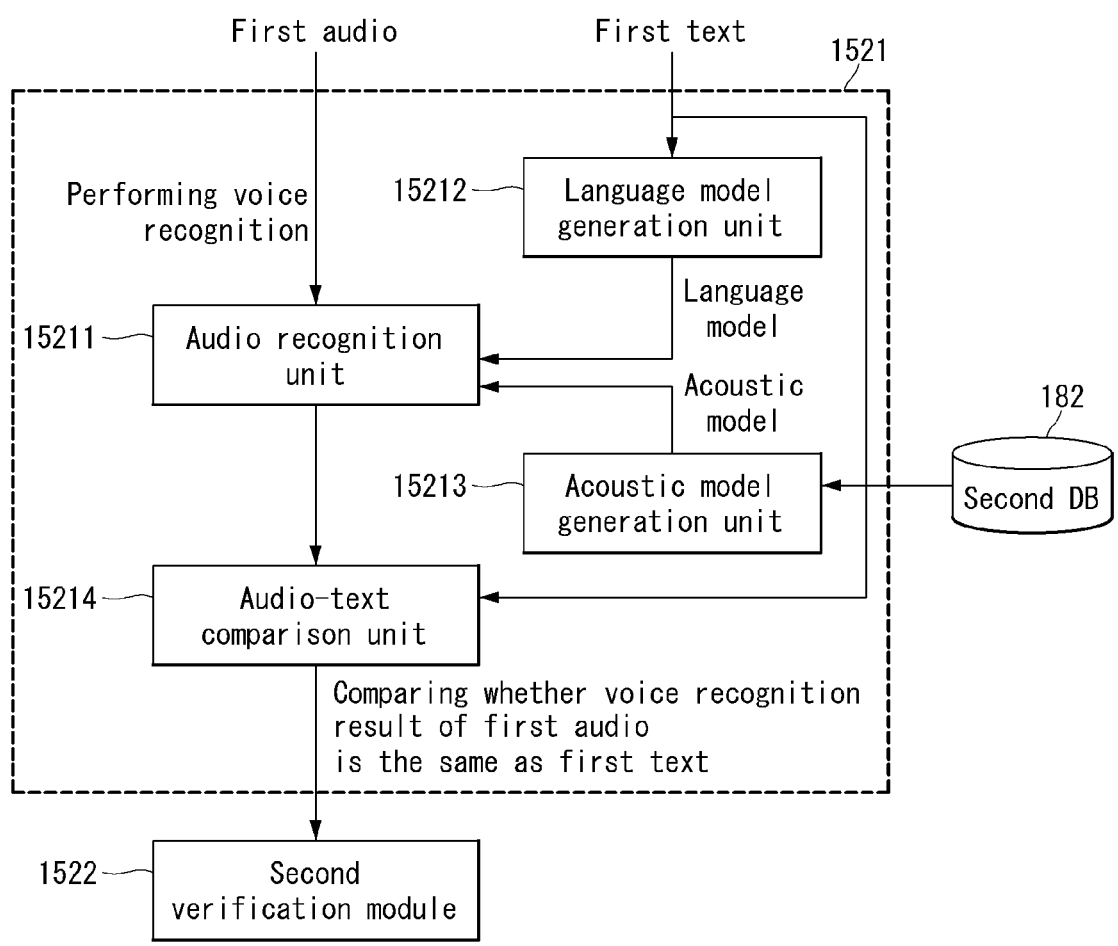
FIG. 12 is a conceptual diagram illustrating a process of verifying a first audio by a first verification module according to an embodiment of the present disclosure.

With reference to FIGS. 11 and 12, the first verification module 1521 according to an embodiment of the present disclosure is described below. FIG. 11 is a block diagram illustrating configuration of the first verification module 1521 according to an embodiment of the present disclosure. FIG. 12 is a conceptual diagram illustrating a process of verifying a first audio by the first verification module 1521 according to an embodiment of the present disclosure.

Referring to FIG. 11, the first verification module 1521 includes an audio recognition unit 15211, a language model generation unit 15212, an acoustic model generation unit 15213, and an audio-text comparison unit 15214.

The first text and the first audio generated by the voice synthesis unit 152 may be input to the first verification module 1521.

Referring to FIG. 12, the first audio is input to the audio recognition unit 15211 and is recognized. In this instance, the audio recognition unit 15211 has a speech-to-text (STT) function, and the first audio recognized by the audio recognition unit 15211 is converted into a text. The first text is input to the language model generation unit 15212, and language models that can be generated with the first text are generated.

The acoustic model generation unit 15213 provides the audio recognition unit 15211 with an acoustic model that is a set of various audio data for the existing speaker stored in the second database 182, and helps the audio recognition unit 15211 to accurately recognize the first audio.

The audio recognition unit 15211 recognizes the first audio with the help of the language model generation unit 15212 and the acoustic model generation unit 15213, and sends a recognized result to the audio-text comparison unit 15214.

The audio-text comparison unit 15214 compares a text, that is generated according to the recognized result of the first audio, with the first text that is directly input to the audio-text comparison unit 15214, and checks whether a text represented by the first audio matches the first text.

If the text represented by the first audio matches the first text, the audio-text comparison unit 15214 determines that that the voice synthesis unit 152 has generated accurately the first audio, and sends the first audio to the second verification module 1522.

On the other hand, if the text represented by the first audio does not match the first text, the audio-text comparison unit 15214 requests the voice synthesis unit 152 to generate again the first audio and can allow the existing generated first audio not to be stored in the first database 181. For example, if the first text is 'Turn on the OCN channel', and the first audio recognized by the audio recognition unit 15211 is 'Play OCN', the audio-text comparison unit 15214 determines that the partial content of the first text has been omitted in the first audio generated by the voice synthesis unit 152, and can request the voice synthesis unit 152 to generate again the first audio based on the first text.

The first verification module 1521 finishes examining whether the text content is missing or repeated, and the sound quality of the first audio sent to the second verification module 1522 is measured by the second verification module 1522.

That is, the second verification module 1522 can measure whether the first audio generated by the voice synthesis unit 152 interferes with a noise and is prevented from being accurately recognized by the voice recognition unit 153.

Figure 13:
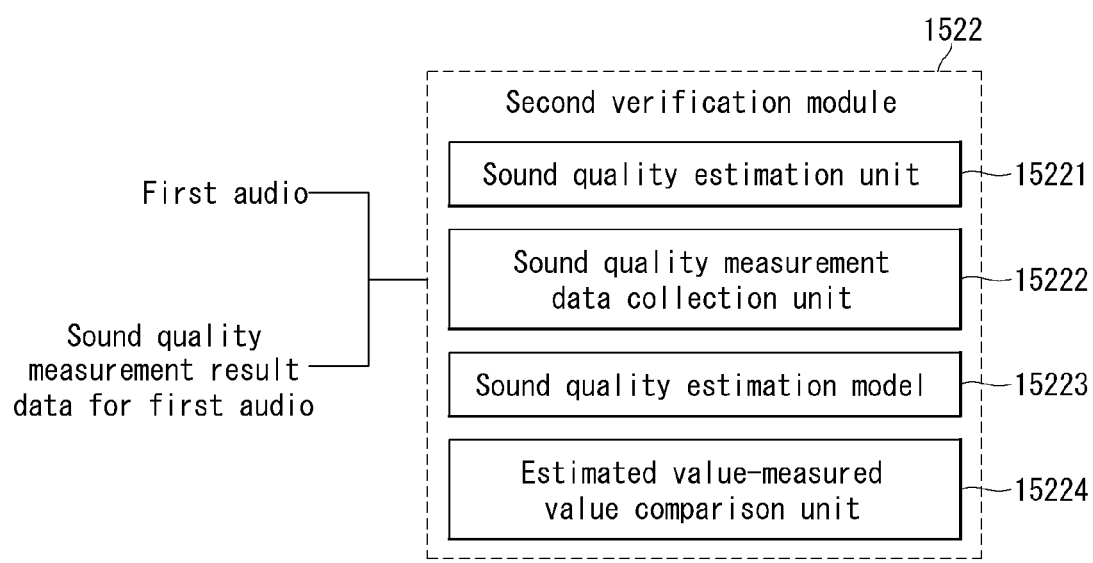
FIG. 13 is a block diagram illustrating in detail configuration of a second verification module according to an embodiment of the present disclosure.
Figure 14:
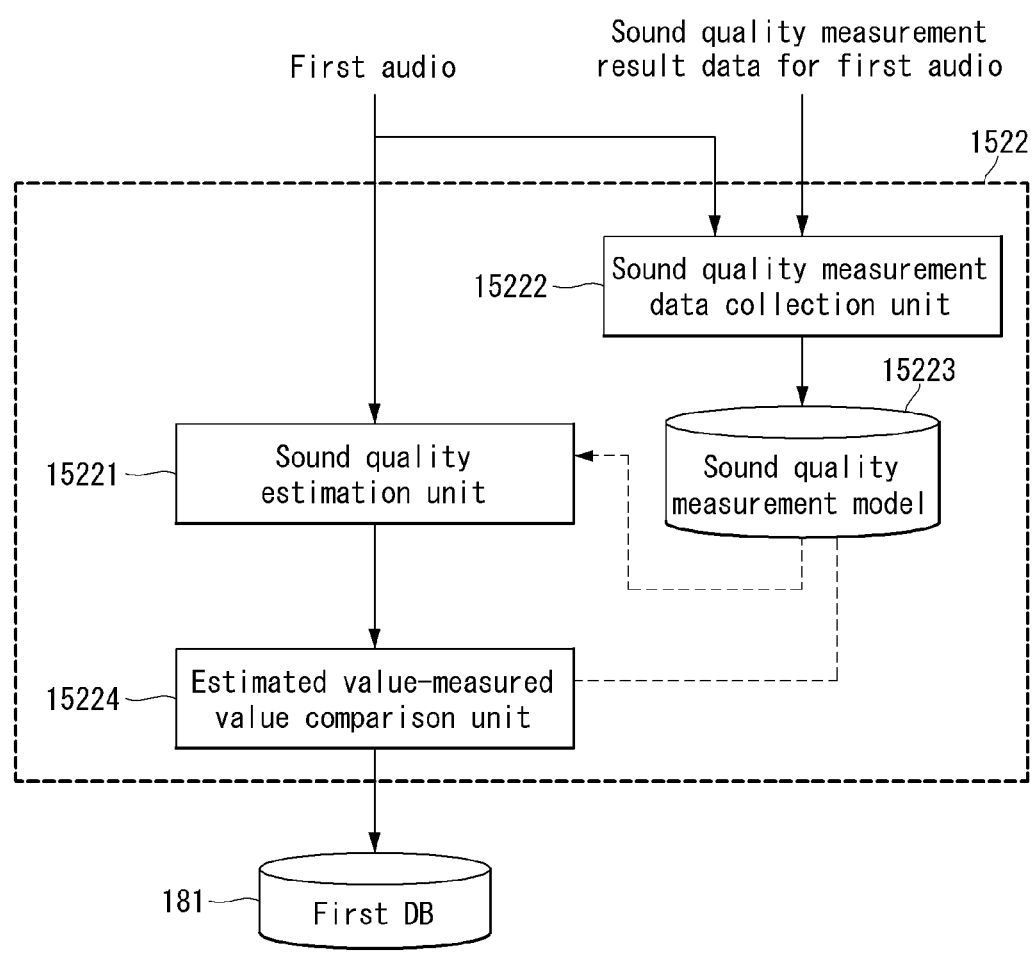
FIG. 14 is a flow chart illustrating a process of examining a sound quality level of a first audio by a second verification module according to an embodiment of the present disclosure.

With reference to FIGS. 13 and 14, a process is described in which the second verification module 1522 examines a sound quality level of the first audio and determines whether the first audio is stored in the first database.

FIG. 13 is a block diagram illustrating in detail configuration of the second verification module 1522 according to an embodiment of the present disclosure. FIG. 14 is a flow chart illustrating a process of examining a sound quality level of a first audio by the second verification module 1522 according to an embodiment of the present disclosure.

Referring to FIG. 13, the second verification module 1522 according to an embodiment of the present disclosure includes a sound quality estimation unit 15221, a sound quality measurement data collection unit 15222, a sound quality measurement model 15223, and an estimated value-measured value comparison unit 15224.

The first audio that has gone through the first verification module 1521 is input to the sound quality estimation unit 15221 of the second verification module 1522. The sound quality estimation unit 15221 analyzes a frequency of the first audio and generates an estimated value of the sound quality of the first audio.

A data value that the user or the manager directly listens to the first audio and evaluates or measures the sound quality of the first audio is input to the sound quality measurement data collection unit 15222. In this instance, the first audio together with the data value are input to the sound quality measurement data collection unit 15222, and sound quality measurement data for the first audio evaluated by the user or the manager is tagged to the corresponding audio.

Next, the sound quality measurement data for the first audio evaluated by the user or the manager is sent to the sound quality measurement model 15223. The sound quality measurement model 15223 learns the sound quality measurement data using a neural network model included in the sound quality measurement model 15223, and then calculates a sound quality measurement value.

Next, the calculated sound quality measurement value is sent to the sound quality estimation unit 15221 or the estimated value-measured value comparison unit 15224.

The estimated value-measured value comparison unit 15224 collects a sound quality estimation value from the sound quality estimation unit 15221 and collects the sound quality measurement value from the sound quality measurement model 15223 to compare the two values. In this case, if a difference between the sound quality estimation value and the sound quality measurement value is equal to or greater than a predetermined value, i.e., a threshold, the estimated value-measured value comparison unit 15224 decides that the sound quality estimation value and the sound quality measurement value have somewhat low measurement reliability, and thus can determine the good or bad sound quality based on the sound quality measurement value.

On the other hand, if the difference between the sound quality estimation value and the sound quality measurement value is equal to or less than the predetermined value, i.e., the threshold, the estimated value-measured value comparison unit 15224 decides that the sound quality estimation value and the sound quality measurement value have high measurement reliability, and thus can determine the good or bad sound quality based on at least one of the sound quality estimation value and the sound quality measurement value.

Even if the sound quality measurement data for the first audio evaluated by the user or the manager is input to the sound quality measurement data collection unit 15222, the estimated value-measured value comparison unit 15224 can determine the good or bad sound quality using only the sound quality estimation value calculated from the sound quality estimation unit 15221.

The criteria in which the estimated value-measured value comparison unit 15224 decides whether the sound quality is good or bad are a frequency form of the first audio, a frequency band, a type of frequency included, a magnitude of a frequency signal, a gain of a frequency signal, and features of a frequency signal. The estimated value-measured value comparison unit 15224 comprehensively analyzes the above-described items, and can determine the first audio as the good sound quality if an average value of a sum of result values analyzing the respective items represents a numerical value equal to or greater than a predetermined level, and can determine the first audio as the bad sound quality if the average value represents a numerical value equal to or less than the predetermined level.

The first audio that the estimated value-measured value comparison unit 15224 determines as the good sound quality is sent to the first database 181 and allows the first database 181 to store the first audio. The first audio that the estimated value-measured value comparison unit 15224 determines as the bad sound quality is not sent to the first database 181. In this case, the estimated value-measured value comparison unit 15224 may request the voice synthesis unit 152 to generate again the first audio.

With reference to FIGS. 15 to 18, the first voice synthesis model 1543 and the second voice synthesis model 1544 included in the data learning unit 154 according to an embodiment of the present disclosure are described below. The second voice synthesis model 1544 is a component that can be additionally disposed in addition to the first voice synthesis model 1543 as necessary to improve functions and effects, and may have substantially the same configuration as the first voice synthesis model 1543. Thus, a description of the first voice synthesis model 1543 can be equally applied to the second voice synthesis model 1544.

Figure 15:
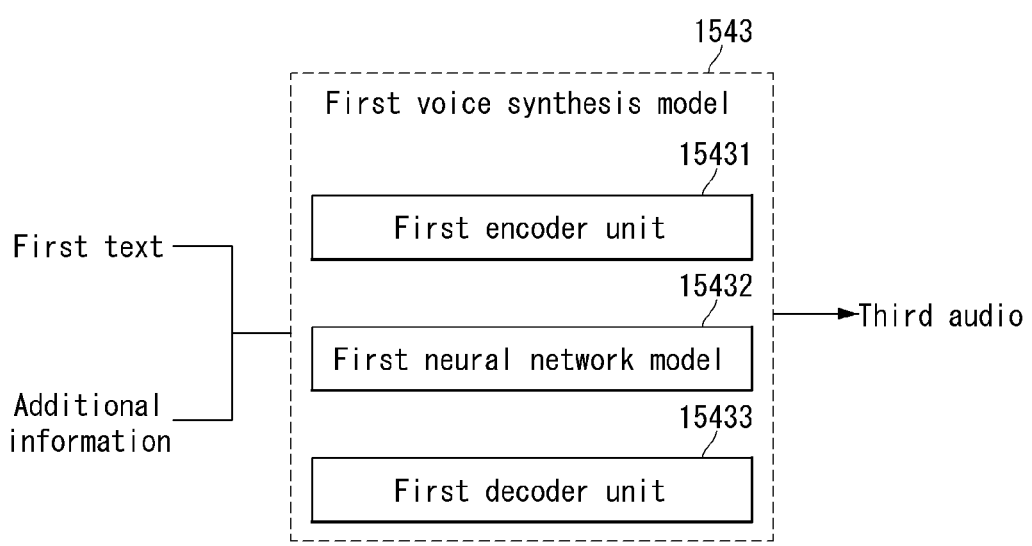
FIG. 15 is a block diagram illustrating configuration of a first voice synthesis model according to an embodiment of the present disclosure.

FIG. 15 is a block diagram illustrating configuration of the first voice synthesis model 1543 according to an embodiment of the present disclosure.

Referring to FIG. 15, the first voice synthesis model 1543 includes a first encoder unit 15431, a first neural network model 15432, and a first decoder unit 15433.

The first voice synthesis model 1543 receives and learns a first text, additional information, and a second audio separately from the voice synthesis unit 152, and generates a third audio based on the content of the first text. However, since the first voice synthesis model 1543 generates the audio based on the content of the first text in the same manner as the voice synthesis unit 152, the first audio and the third audio are sound sources containing the same content.

For example, if the first text is 'Turn on my car', the voice synthesis unit 152 may generate 'Turn on my car' as the first audio. The first voice synthesis model 1543 may generate 'Turn on my car' as the third audio.

Since the first audio and the third audio are sound sources created by reflecting additional information, they are sound sources created based on information on the same speaker. For example, if the first text is 'The cloud beer is delicious' and the speaker is set to 'Actor Jiyeon JEON', the voice synthesis unit 152 can generate the first audio that 'The cloud beer is delicious' is spoken with a voice of 'Actor Jiyeon JEON'.

The first voice synthesis model 1543 can generate the third audio that 'The cloud beer is delicious' is spoken with a voice of 'Actor Jiyeon JEON'.

When the first voice synthesis model 1543 generates the third audio, the first voice synthesis model 1543 learns the first text, the additional information, and the second audio through a neural network model and then generates the third audio. And, the first voice synthesis model 1543 stores the third audio in the first database 181 and the second database 182 and can refer to it when the voice synthesis unit 152 generates the first audio. Thus, the process for the first voice synthesis model 1543 to generate the third audio is substantially the same as replacing the process for the voice synthesis unit 152 to generate the first audio by the AI learning process, and the first voice synthesis model 1543 may function to AI-train the voice synthesis unit 152.

The first encoder unit 15431 receives and encodes the first text, the additional information, and the second audio to quantify them. The first neural network model 15432 receives and learns first encoding data encoded by the first encoder unit 15431.

The first decoder unit 15433 decodes sound source data derived as a learning result of the first neural network model to generate the third audio.

Figure 16:
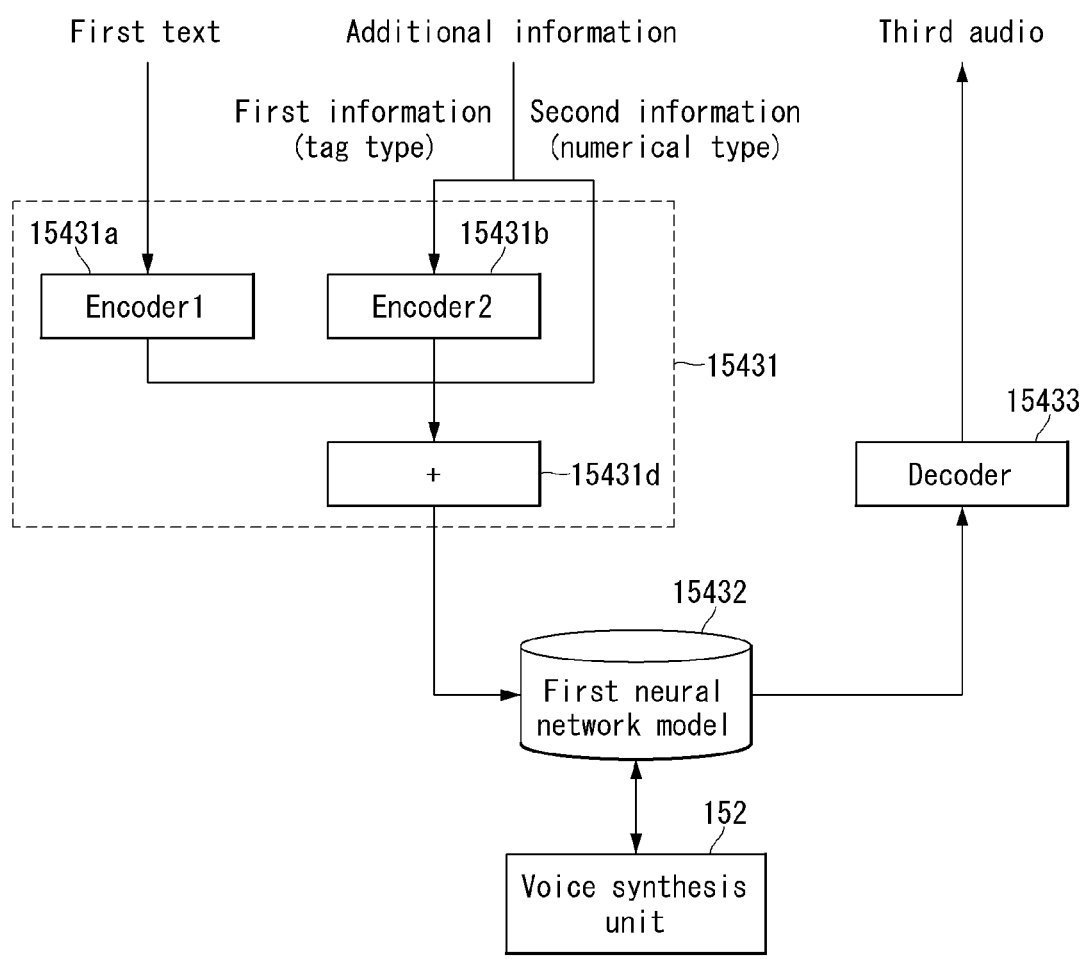
FIG. 16 is a flow chart illustrating a process of generating a third audio by a first voice synthesis model in accordance with an embodiment of the present disclosure.
Figure 17:
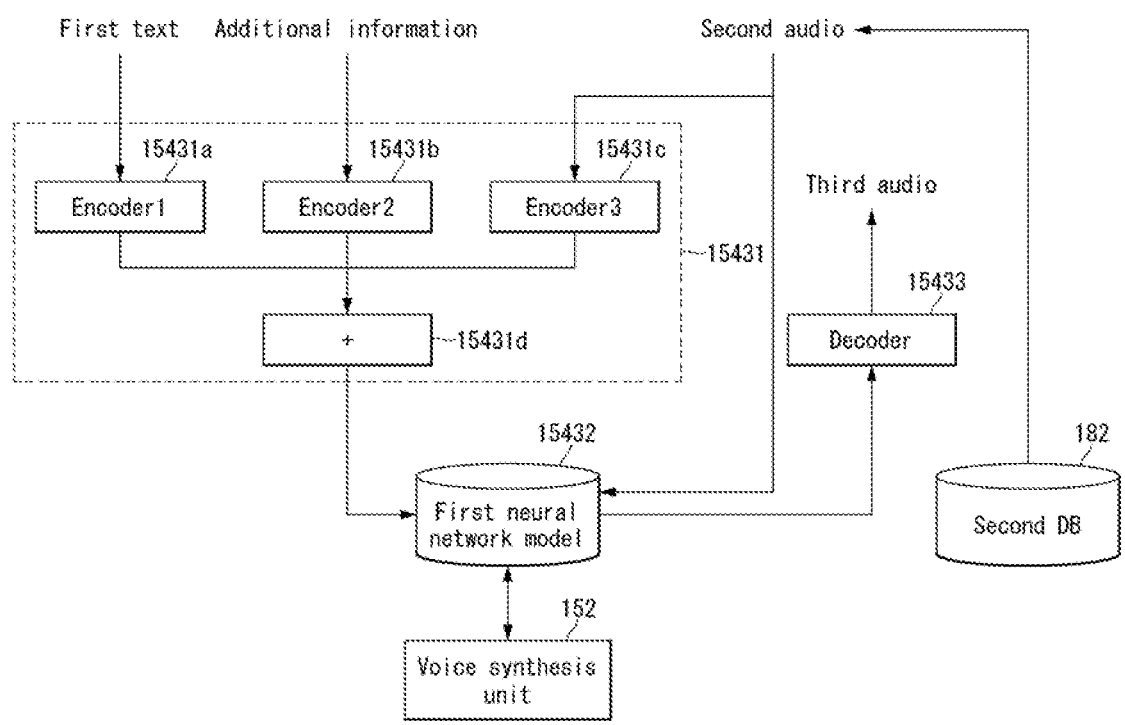
FIG. 17 is a flow chart illustrating a process of generating a third audio by a first voice synthesis model in accordance with another embodiment of the present disclosure.

With reference to FIGS. 16 and 17, a process for the first voice synthesis model 1543 to generate the third audio is described in detail below. FIG. 16 is a flow chart illustrating a process for the first voice synthesis model 1543 to generate a third audio in accordance with an embodiment of the present disclosure. FIG. 17 is a flow chart illustrating a process for the first voice synthesis model 1543 to generate a third audio in accordance with another embodiment of the present disclosure.

Referring to FIG. 16, the first encoder unit 15431 may include an encoder 1 and an encoder 2.

A first text is input to the encoder 1, and the encoder 1 extracts graphemes from the input first text and encodes a relationship between them. That is, the encoder 1 quantifies the first text to generate a vector 1. The encoder 2 encodes first information (i.e., tagged information) among information included in additional information and a relationship between them. The encoder 2 quantifies all information specifying features of a speaker, that is the tagged information, for example, gender, age, and region of birth of the speaker, whether the speaker is a celebrity, and whether the speaker uses a dialect to generate a vector 2. Both the vector 1 and the encoder 2 may be encompassed and referred to as first encoding data.

The vector 1 and the vector 2 encoded by the encoder 1 and the encoder 2 are the first encoding data, which are merged into a composite layer 15431*d* and modeled.

Since second information included in additional information, i.e., feeling, vocalization size, utterance speed, level of noise, intonation, accent, and tone when the speaker speaks an utterance sentence are generally numerical information, the second information is directly merged into the composite layer 15431*d* and modeled without passing through the encoder.

Next, the first neural network model 15432 learns a model modeled in the composite layer 15431*d* and generates sound source data or audio data through a result of learning the model. The first decoder unit 15433 extracts time series features from the sound source data or the audio data generated by the first neural network model 15432 to generate a first audio.

The voice synthesis unit 152 may infer sound source data using the model learned by the first neural network model 15432 and the learning result. That is, the voice synthesis unit 152 may divide the first text input to the encoder 1 based on a character string and synthesize voices for each character string.

The voice synthesis unit 152 may distinguish additional information input to the encoder 2, i.e., first information and second information. In other words, the voice synthesis unit 152 may distinguish information specifying a speaker, for example, who the speaker is, gender, age, and region of birth of the speaker, and information specifying a voice style of the speaker, for example, sensitivity of the speaker, loudness, speed of speech, noise level, intonation, accent and tone, etc., to synthesize voices.

The voice synthesis unit 152 may generate the first audio through the first decoder unit 15433 based on information input to the encoder 1 and the encoder 2.

Referring to FIG. 17, the first encoder unit 15431 may further include an encoder 3. In this case, the encoder 3 receives a second audio from the second database 182 and encodes the second audio to quantify the second audio. The encoder 3 may generate a vector 3 as a result of encoding the second audio, and the vector 3 may also be included in the first encoding data. The vector 3, as the first encoding data, is merged into the composite layer 15431*d* and modeled.

The second audio provided from the second database 182 is directly provided to the first neural network model 15432, and the first neural network model 15432 can directly learn the second audio.

Next, the first neural network model 15432 learns a model modeled in the composite layer 15431*d* and generates sound source data or audio data through a result of learning the model. The first decoder unit 15433 extracts time series features from the sound source data or the audio data generated by the first neural network model 15432 to generate a first audio.

The voice recognition device 100 according to another embodiment of the present disclosure may include at least two voice synthesis models in the data learning unit 154, as illustrated in FIG. 9. For example, referring to FIG. 18, the first voice synthesis model 1543 may provide the second voice synthesis model 1544 with a third audio generated as a result learned by the first neural network model 15432, as learning data.

Figure 18:
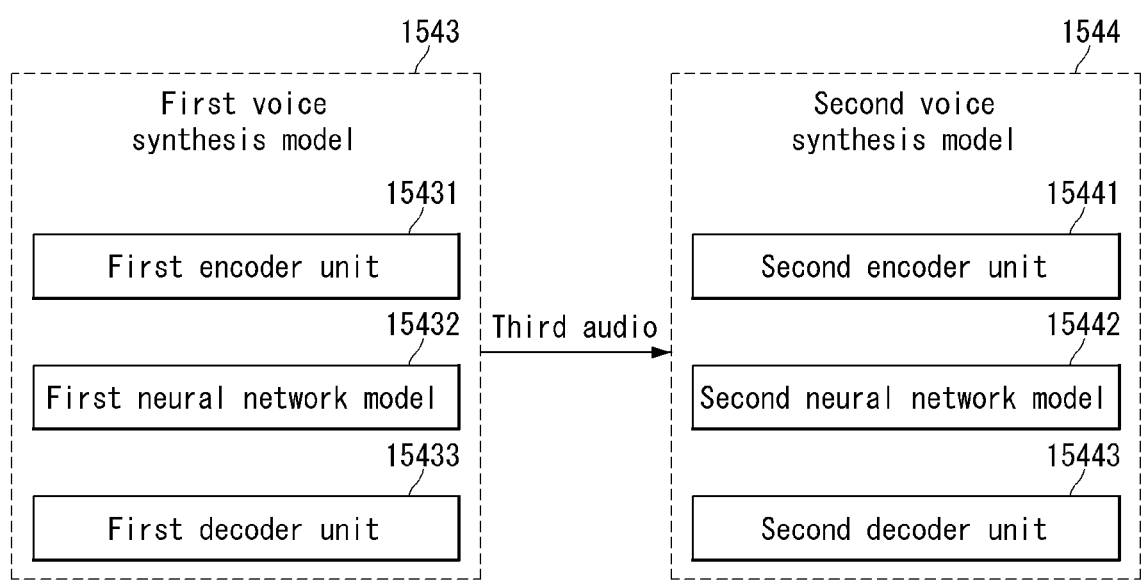
FIG. 18 illustrates configuration of a data learning unit including a plurality of voice synthesis models in accordance with another embodiment of the present disclosure.

FIG. 18 illustrates configuration of the data learning unit 154 including a plurality of voice synthesis models in accordance with another embodiment of the present disclosure.

The second voice synthesis model 1544 additionally learns the third audio generated by the first voice synthesis model 1543 to convert or regenerate an artificially synthesized voice into a voice that feels more natural. That is, the third audio generated by the first voice synthesis model 1543 is a machine-synthesized voice and may give an artificial feeling. The second voice synthesis model 1544 learns again the third audio and generates a fourth audio that is similar to an utterance spoken by a person as much as possible.

Accordingly, the second voice synthesis model 1544 may have substantially the same configuration as the first voice synthesis model 1543. Referring to FIG. 18, the second voice synthesis model 1544 includes a second encoder unit 15441, a second neural network model 15442, and a second decoder unit 15443.

The second encoder unit 15441 receives and encodes a first text, additional information, a second audio, and a third audio. The second neural network model 15442 receives and learns second encoding data encoded by the second encoder unit 15441. The second decoder unit 15443 decodes sound source data derived as a learning result of the second neural network model 15442 to generate a fourth audio.

Figure 19:
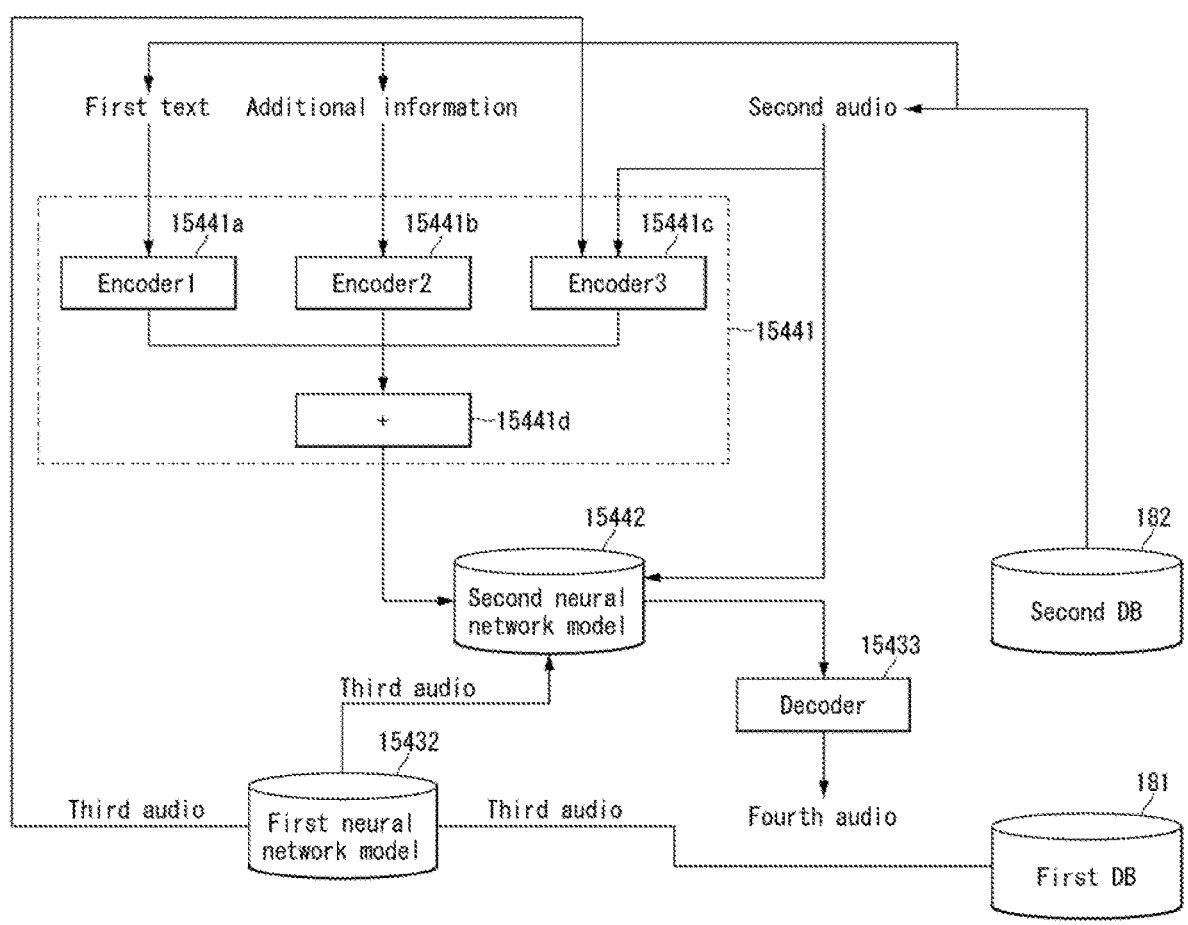
FIG. 19 is a flow chart illustrating a process of generating a fourth audio by a second voice synthesis model according to another embodiment of the present disclosure.

Referring to FIG. 19, a process is described in which the second voice synthesis model 1544 generates a fourth audio by additionally learning the third audio generated by the first voice synthesis model 1543.

FIG. 19 is a flow chart illustrating a process of generating a fourth audio by the second voice synthesis model 1544 according to another embodiment of the present disclosure.

The second encoder unit 15441 includes an encoder 1, an encoder 2, and an encoder 3. The second encoder unit 15441 further includes a composite layer 15441*d* merging second encoding data that is encoded and generated by the encoder 1, the encoder 2, and the encoder 3.

The first neural network model 15432 transmits the generated third audio to the second neural network model 15442 and the encoder 3. At the same time, the first neural network model 15432 can store the third audio in the first database 181.

A first text is input to the encoder 1, and the encoder 1 extracts graphemes from the input first text and encodes a relationship between them. That is, the encoder 1 quantifies the first text to generate a vector 1. The encoder 2 encodes first information (i.e., tagged information) among information included in additional information and a relationship between them. The encoder 2 quantifies all information specifying features of a speaker, that is the tagged information, for example, gender, age, and region of birth of the speaker, whether the speaker is a celebrity, and whether the speaker uses a dialect to generate a vector 2. Both the vector 1 and the vector 2 may be encompassed and referred to as second encoding data.

A second audio from the second database 182 is input to the encoder 3, and a third audio form the first neural network model 15432 is input to the encoder 3. The encoder 3 encodes and quantifies the second audio and the third audio to generate a vector 3.

The vectors 1, 2, and 3 encoded by the encoder 1, the encoder 2, and the encoder 3 are the second encoding data, which are merged into the composite layer 15441*d* and modeled.

The second audio and the third audio may be immediately input to the composite layer 15431*d* and modeled, separately from an audio input to the second encoder unit 15441.

Next, the second neural network model 15442 learns a model modeled in the composite layer 15441*d* and generates sound source data or audio data through a result of learning the model. The second decoder unit 15443 extracts time series features from the sound source data or the audio data generated by the second neural network model 15442 to generate a fourth audio.

Accordingly, the voice recognition device 100 including a plurality of voice synthesis models according to the present disclosure can generate an audio almost similar to an utterance that a person actually speaks.

With reference to FIGS. 20 to 23, a method for learning voice data using a voice recognition device according to an embodiment of the present disclosure is described below. In the following description of the method for learning voice data using the voice recognition device, the same configurations as the voice recognition device described above may be designated with the same reference numerals, and a repeated description may be omitted.

Figure 20:
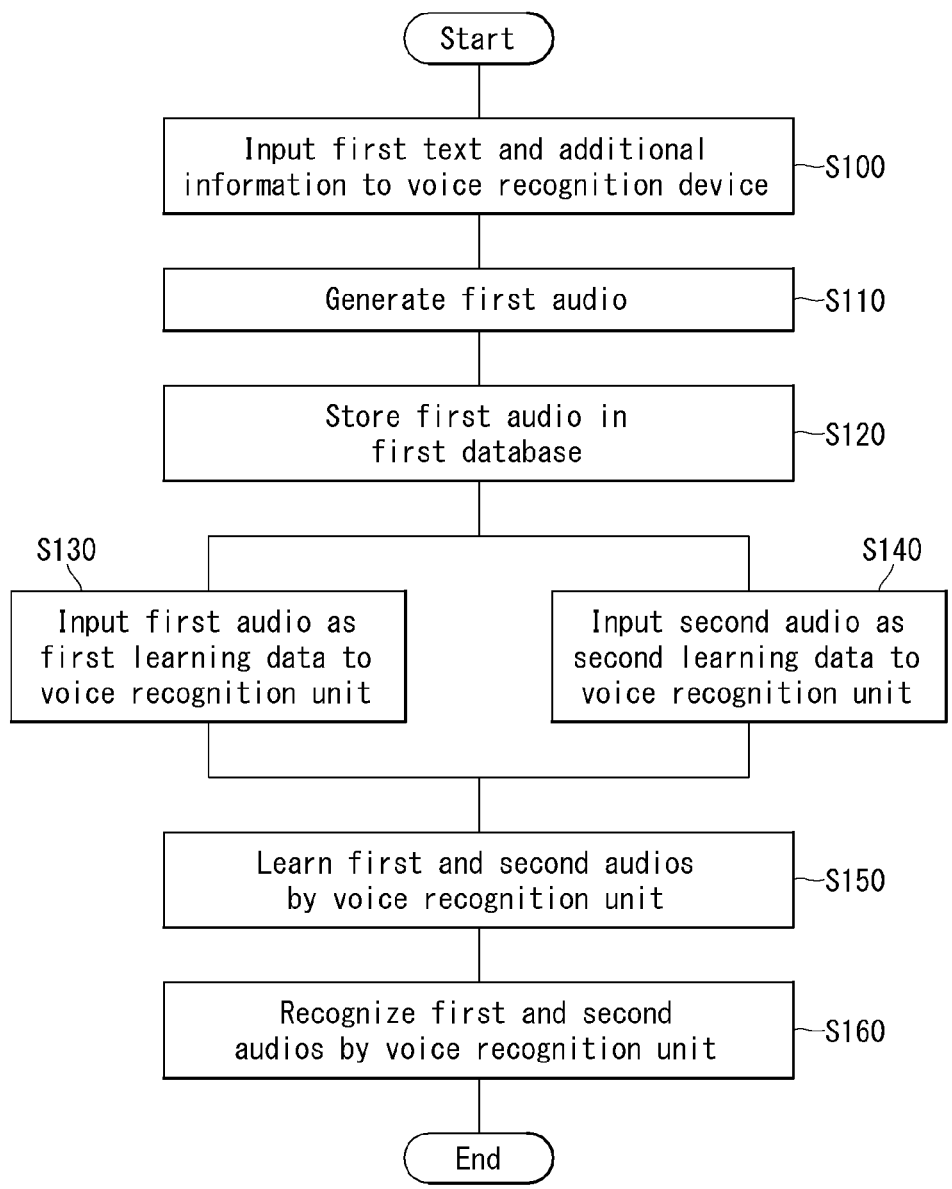
FIG. 20 is a flow chart illustrating a method for learning voice data using a voice recognition device according to an embodiment of the present disclosure.

FIG. 20 is a flow chart illustrating a method for learning voice data using a voice recognition device according to an embodiment of the present disclosure.

Referring to FIG. 20, when the voice recognition device 100 is powered on, it starts to operate. A user or manager inputs a first text and additional information to the voice recognition device 100 in S100.

The voice recognition device 100 generates a first audio based on the first text and the additional information in S110.

Next, the voice recognition device 100 stores the first audio, as first learning data, in a first database in S120.

The first audio stored in the first database is provided to the voice recognition unit 153 of the voice recognition device 100 as the first learning data in S130.

At the same time as this, a second audio stored in a second database is input to the voice recognition unit 153 as second learning data in S140.

The voice recognition unit 153 learns the first learning data and the second learning data to recognize the first and second audios in S150.

Next, the voice recognition unit 153 recognizes the first and second audios based on a result of learning the first learning data and the second learning data in S160.

Figure 21:
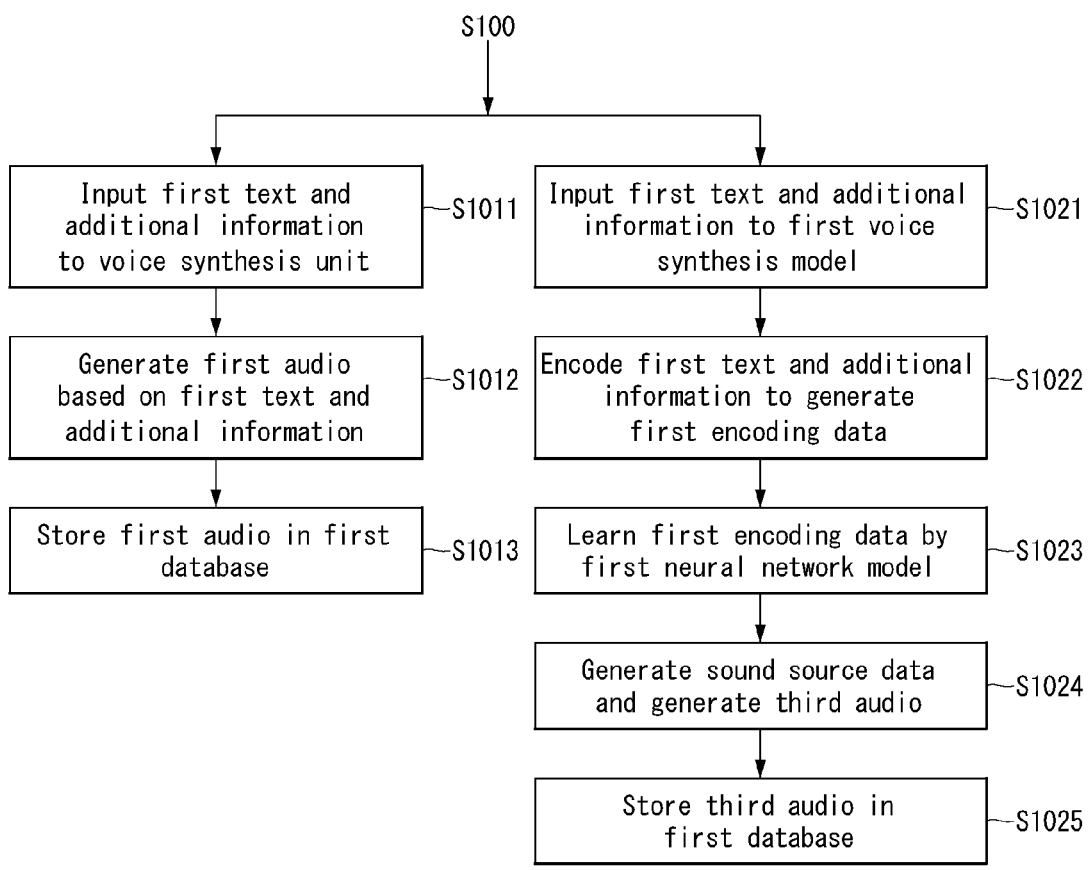
FIG. 21 is a flow chart illustrating a process of processing a first text and additional information by a voice recognition device according to an embodiment of the present disclosure.

With reference to FIG. 21, the step S100 of processing the first text and the additional information input to the voice recognition device 100 is described in more detail below. FIG. 21 is a flow chart illustrating a process of processing a first text and additional information input to the voice recognition device according to an embodiment of the present disclosure.

Referring to FIG. 21, when the first text and the additional information are input in the step S100, the voice recognition device 100 inputs the first text and the additional information to the voice synthesis unit 152 in S1011, or to the first voice synthesis model 1543 in S1021.

Next, the voice synthesis unit 152 generates the first audio based on the first text and the additional information in S1012, and the first audio is stored in the first database in S1013.

The first voice synthesis model 1543 encodes the first text and the additional information in a first encoding unit to generate first encoding data in S1022.

Next, the first encoding data is learned in a first neural network model in S1023, and the first neural network model generates sound source data as a result of learning the first encoding data and decodes the sound source data to generate a third audio in S1024. The third audio generated in the first voice synthesis model 1543 is stored in the first database as first learning data in S1025.

Figure 22:
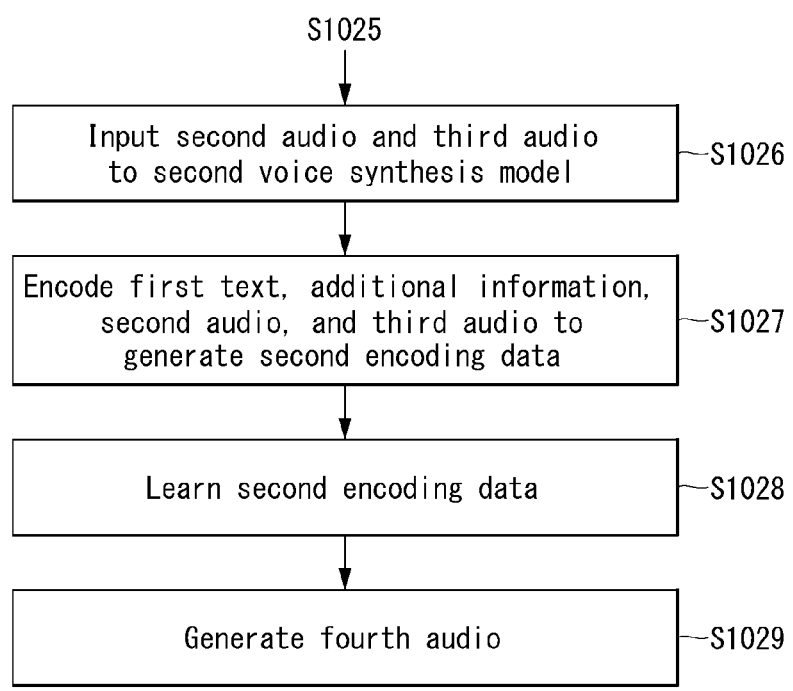
FIG. 22 is a flow chart illustrating a process of generating a fourth audio using a plurality of voice recognition models in accordance with another embodiment of the present disclosure.

With reference to FIG. 22, a method is described which generates a synthesized voice as an audio close to an utterance of a natural language spoken by a person using a plurality of voice recognition models. FIG. 22 is a flow chart illustrating a process of generating a fourth audio using a plurality of voice recognition models in accordance with another embodiment of the present disclosure.

Referring to FIG. 22, a second audio and a third audio are input to the second voice synthesis model 1544 in S1026.

The second voice synthesis model 1544 encodes a first text, additional information, the second audio, and the third audio to generate second encoding data in S1027. Next, the second voice synthesis model 1544 learns the second encoding data in S1028 and generates a fourth audio based on a learning result in S1029.

Figure 23:
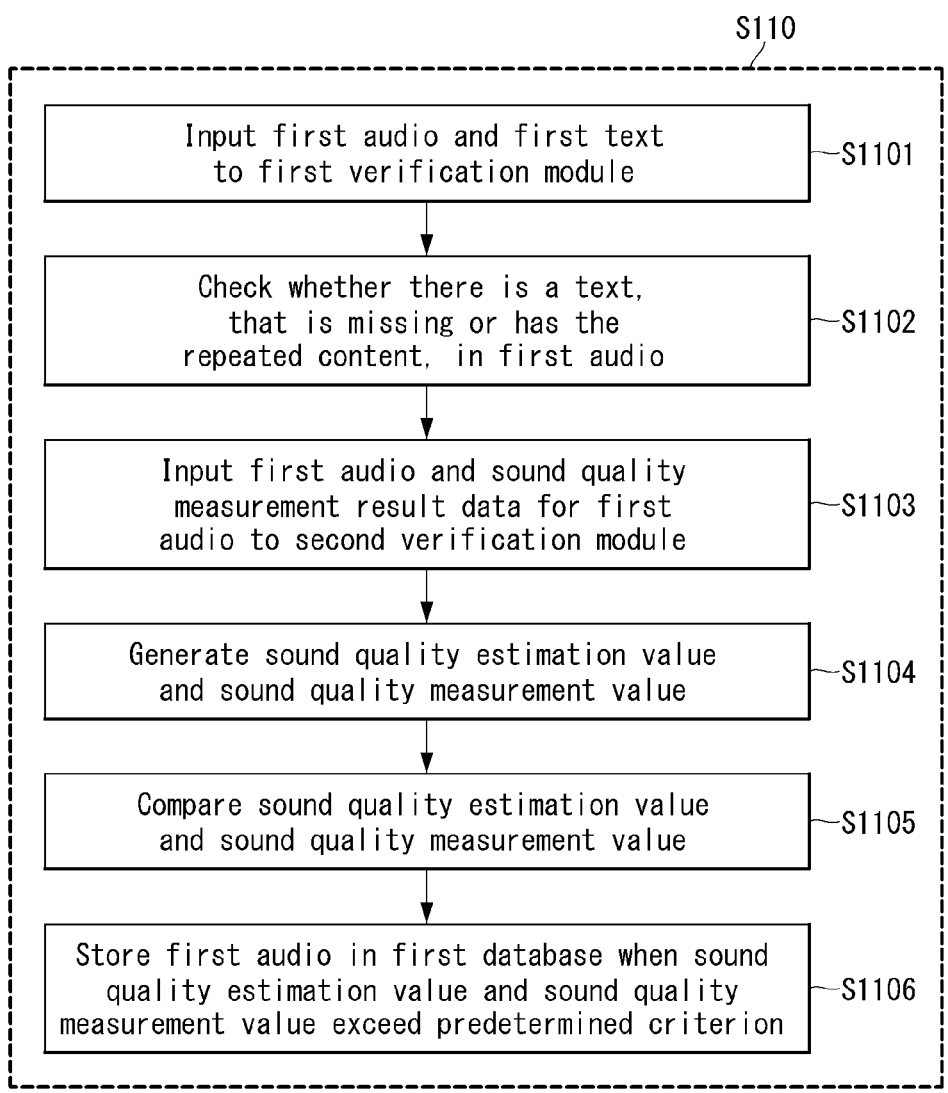
FIG. 23 is a flow chart illustrating a process of verifying a first audio by a voice recognition device according to an embodiment of the present disclosure.

With reference to FIG. 23, a process of verifying a first audio by the voice recognition device 100 according to the present disclosure is described in more detail below. FIG. 23 is a flow chart illustrating a process of verifying a first audio by the voice recognition device 100 according to an embodiment of the present disclosure.

Referring to FIG. 23, when the first audio is generated in the step S110, the first audio and the first text are input to the first verification module 1521 included in the voice synthesis unit 152 in S1101.

Next, the first verification module 1521 examines whether there is a text that is missing from the first audio or has the repeated content in the first audio in S1102.

Next, the first audio and sound quality measurement result data for the first audio are input to the second verification module 1522 in S1103.

The second verification module 1522 generates a sound quality estimation value and a sound quality measurement value based on the first audio and the sound quality measurement result data for the first audio in S1104, and compares the two values in S1105.

The second verification module 1522 determines that the sound quality measurement value for the first audio was accurately measured, when a difference between the sound quality estimation value and the sound quality measurement value or an absolute value of the difference exceeds a predetermined value. However, when a difference between the sound quality estimation value and the sound quality measurement value or an absolute value of the difference does not exceed the predetermined value, the second verification module 1522 decides that the sound quality measurement value for the first audio was inaccurately measured.

Next, the second verification module 1522 determines whether each of the sound quality estimation value and the sound quality measurement value exceeds a predetermined criterion, and then determines whether the first audio is stored in the first database 181. If each of the sound quality estimation value and the sound quality measurement value exceeds the predetermined criterion, the second verification module 1522 stores the first audio in the first database 181. However, if each of the sound quality estimation value and the sound quality measurement value does not exceed the predetermined criterion, the second verification module 1522 requests the voice synthesis unit 152 to generate again the first audio.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A voice recognition device comprising:
   a first database configured to store a first audio as first learning data;
   a second database configured to store a second text that has been previously entered or been previously stored and a second audio for the second text as second learning data;
   a first verification module;
   a second verification module; and
   one or more processors configured to:
   receive a first text input by a user and additional information on a speaker associated with the first text, wherein the additional information includes first information and second information on the speaker;
   generate the first audio based on the first text and the additional information by:
     inputting the first text and the first audio to the first verification module, and
     after verifying, by the first verification module, that there is text content that is missing from the first audio or is repeated in the first audio:
       input the first audio and sound quality measurement result data for the first audio to the second verification module,
       generate a sound quality measurement value based on the first audio and the sound quality measurement result data for the first audio,
       generate a sound quality estimation value for the first audio, and
       compare, by the second verification module, the sound quality estimation value and the sound quality measurement value of the first audio;
   receive and learn the first learning data and the second learning data received from the first database and the second database, respectively;
   recognize the first audio as a voice based at least in part on a result of learning the first learning data and the second learning data; and
   train the voice recognition device based at least in part on recognition of the first audio as the voice.

2. The voice recognition device of claim 1, wherein the first information includes tag information about a gender and age of the speaker, whether the speaker uses a dialect, and a type of the dialect used,
   wherein the second information includes numerical information that represents a feeling, an utterance sound size, an utterance speed, a type and a size of a noise, an intonation, an accent, and a tone when the speaker speaks.

3. The voice recognition device of claim 1, wherein a processor among the one or more processors includes a first voice synthesis model,
   wherein the first voice synthesis model is configured to receive and learn the first text, the additional information, and the second audio as learning data and generate a third audio for the first text according to a learning result.

4. The voice recognition device of claim 3, wherein the first voice synthesis model is configured to:
   encode the first text, the additional information, and the second audio;
   learn first encoding data encoded by the first encoder unit; and
   decode sound source data derived as a learning result of a first neural network model and generate the third audio.

5. The voice recognition device of claim 4, wherein the processor further includes a second voice synthesis model,
   wherein the first voice synthesis model provides the second voice synthesis model with the third audio as learning data.

6. The voice recognition device of claim 5, wherein the second voice synthesis model is further configured to:
   encode the first text, the additional information, the second audio, and the third audio;
   learn second encoding data encoded by the second encoder unit; and
   decode sound source data derived as a learning result of the second neural network model and generate a fourth audio.

7. The voice recognition device of claim 1,
   wherein the first verification module is configured to determine whether there is a word that is missing from the first audio or is repeated in the first audio.

8. The voice recognition device of claim 1,
   wherein the second verification module includes a sound quality estimation model configured to learn the first audio and estimate a sound quality of the first audio.

9. A method for learning voice data using a voice recognition device, the method comprising:
   inputting a first text by a user and additional information on a speaker associated with the first text to the voice recognition device, wherein the additional information includes first and second information on the speaker;
   generating a first audio by the voice recognition device based on the first text and the additional information by:
     inputting the first text and the first audio to a first verification module, and
     after verifying, by the first verification module, that there is text content that is missing from the first audio or is repeated in the first audio:
       inputting the first audio and sound quality measurement result data for the first audio to a second verification module, generating a sound quality measurement value based on the first audio and the second quality measurement result for the first audio, generating a sound quality estimation value for the first audio, and comparing, by the second verification module, the sound quality estimation value and the sound quality measurement value of the first audio;

storing the first audio as first learning data in a first database;

inputting the first learning data to a voice recognition device;

inputting a second audio stored in a second database to the voice recognition device as second learning data;

learning, by the voice recognition device, the first learning data and the second learning data received from the first database and the second database, respectively;

recognizing the first audio and the second audio by the voice recognition device based at least in part on a result of learning the first learning data and the second learning data; and training the voice recognition device based at least in part on recognition of the first audio as the voice.

10. The method of claim 9, wherein inputting the first text and the additional information to the voice recognition device comprises:

inputting the first text and the additional information to a first voice synthesis model; and inputting the first text and the additional information to a voice synthesis device.

11. The method of claim 10, wherein inputting the first text and the additional information to the first voice synthesis model comprises:

encoding the first text and the additional information to generate first encoding data;

learning the first encoding data by a first neural network model;

generating sound source data as a result of learning the first encoding data by the first neural network model; and decoding the sound source data to generate a third audio.

12. The method of claim 11, further comprising, after decoding the sound source data by the first voice synthesis model to generate the third audio:

inputting the second audio and the third audio to a second voice synthesis model; and learning the first text, the additional information, the second audio, and the third audio by the second voice synthesis model to generate a fourth audio.

13. The method of claim 11, wherein encoding the first text and the additional information to generate the first encoding data comprises:

inputting the second audio stored in the second database to the first voice synthesis model; and encoding the second audio by the first voice synthesis model to include the encoded second audio in the first encoding data.

* * * * *